(12) United States Patent
Ishizeki et al.

(10) Patent No.: US 10,870,332 B2
(45) Date of Patent: Dec. 22, 2020

(54) VEHICLE AIR CONDITIONER

(71) Applicant: SANDEN AUTOMOTIVE CLIMATE SYSTEMS CORPORATION, Isesaki (JP)

(72) Inventors: Tetsuya Ishizeki, Isesaki (JP); Yuma Yamazaki, Isesaki (JP); Akira Horikoshi, Isesaki (JP); Ryo Miyakoshi, Isesaki (JP); Kohei Yamashita, Isesaki (JP); Megumi Shigeta, Isesaki (JP)

(73) Assignee: SANDEN AUTOMOTIVE CLIMATE SYSTEMS CORPORATION, Gunma (JP)

( * ) Notice: Subject to any disclaimer, the term of this patent is extended or adjusted under 35 U.S.C. 154(b) by 72 days.

(21) Appl. No.: 16/332,721

(22) PCT Filed: Sep. 7, 2017

(86) PCT No.: PCT/JP2017/033165
§ 371 (c)(1),
(2) Date: Mar. 12, 2019

(87) PCT Pub. No.: WO2018/070178
PCT Pub. Date: Apr. 19, 2018

(65) Prior Publication Data
US 2019/0248209 A1 Aug. 15, 2019

(30) Foreign Application Priority Data
Oct. 14, 2016 (JP) ................. 2016-202850

(51) Int. Cl.
*B60H 1/00* (2006.01)
*B60H 1/32* (2006.01)
(Continued)

(52) U.S. Cl.
CPC .......... *B60H 1/00978* (2013.01); *B60H 1/22* (2013.01); *B60H 1/32* (2013.01); *F25B 1/00* (2013.01); *F25B 49/02* (2013.01)

(58) Field of Classification Search
CPC ........ B60H 1/00978; B60H 1/32; B60H 1/22; B60H 2001/3238; B60H 2001/3257; F25B 2500/22; F25B 2500/222
See application file for complete search history.

(56) References Cited

U.S. PATENT DOCUMENTS 5,054,294 A * 10/1991 Dudley .............. G05D 23/1912
62/228.4
2015/0033780 A1* 2/2015 Hatomura ............. F25B 41/043
62/208

(Continued)

FOREIGN PATENT DOCUMENTS

CN 1517551 A * 8/2004
CN 101113834 A * 1/2008 .............. F25B 13/00

(Continued)

OTHER PUBLICATIONS

Office Action dated Jun. 22, 2020 issued in Chinese Patent Application No. 201780057355.6.

(Continued)

*Primary Examiner* — Nelson J Nieves
(74) *Attorney, Agent, or Firm* — Cozen O'Connor

(57) ABSTRACT

A vehicle air conditioner is provided which is capable of detecting a refrigerant lack accompanying a refrigerant leakage and the like over time at the earliest possible stage and protecting a compressor. The vehicle air conditioner is provided with a compressor 2, a radiator 4, an outdoor expansion valve 6, and a heat absorber 9. The vehicle air conditioner holds normal time data indicating a relation between the number of revolutions NC of the compressor and a discharge refrigerant temperature Td thereof when a (Continued)

sufficient amount of refrigerant is filled in a refrigerant circuit R. The present invention calculates a discharge refrigerant temperature estimated value Tdst in normal time from the normal time data on the basis of a current number of revolutions NC and compares the discharge refrigerant temperature estimated value Tdst with a current discharge refrigerant temperature Td to determine a refrigerant lack of the refrigerant circuit.

12 Claims, 8 Drawing Sheets

(51) Int. Cl.
    *B60H 1/22*          (2006.01)
    *F25B 49/02*        (2006.01)
    *F25B 1/00*         (2006.01)

(56) References Cited

U.S. PATENT DOCUMENTS

| | | | |
|---|---|---|---|
| 2018/0010834 A1* | 1/2018 | Fujitsuka | F25B 49/02 |
| 2018/0031290 A1* | 2/2018 | Ho | B64D 13/06 |
| 2020/0166233 A1* | 5/2020 | Takagi | F24F 11/62 |

FOREIGN PATENT DOCUMENTS

| | | | | |
|---|---|---|---|---|
| CN | 101216231 A | * | 7/2008 | ........... F25B 49/005 |
| CN | 100549573 C | * | 10/2009 | |
| CN | 101793445 A | * | 8/2010 | ........... F25D 31/002 |
| CN | 102639943 | | 8/2012 | |
| CN | 103057382 | | 4/2013 | |
| CN | 103380334 A | * | 10/2013 | ........... F25B 49/022 |
| CN | 103688117 | | 3/2014 | |
| CN | 203771791 U | * | 8/2014 | ........... F24H 9/2021 |
| CN | 104315666 | | 1/2015 | |
| CN | 104412050 | | 3/2015 | |
| CN | 104567158 | | 4/2015 | |
| CN | 105423484 | | 3/2016 | |
| CN | 105438182 | | 3/2016 | |
| CN | 105546771 | | 5/2016 | |
| EP | 2872864 | | 5/2015 | |
| EP | 3130870 A1 | * | 2/2017 | ............. F25B 49/02 |
| JP | 08178439 A | * | 7/1996 | |
| JP | 2000-304388 | | 11/2000 | |
| JP | 2006-023051 | | 1/2006 | |
| JP | 4281334 | | 6/2009 | |
| JP | 2011-163728 | | 8/2011 | |
| JP | 2012-228945 | | 11/2012 | |
| JP | 2013-204871 | | 10/2013 | |
| JP | 2014-224611 | | 12/2014 | |
| JP | 2016-090177 | | 5/2016 | |
| KR | 20080059907 A | * | 7/2008 | |
| KR | 2009068972 A | * | 12/2010 | ............ F24F 11/008 |
| KR | 20130022464 | | 3/2013 | |
| KR | 20140094814 | | 7/2014 | |
| WO | WO 2014/009732 | | 1/2014 | |
| WO | WO-2014009732 A1 | * | 1/2014 | .......... G01M 3/2815 |
| WO | WO-2014103620 A1 | * | 7/2014 | ............. F25B 49/02 |
| WO | WO-2014181559 A1 | * | 11/2014 | ............. F25B 30/02 |
| WO | WO-2015083399 A1 | * | 6/2015 | ............. F25B 49/02 |
| WO | WO 2016/043308 | | 3/2016 | |
| WO | WO-2016043308 A1 | * | 3/2016 | ......... B60H 1/00035 |

OTHER PUBLICATIONS

Office Action dated Jul. 7, 2020 issued in Japanese Patent Application No. 2016-202850.

* cited by examiner

VEHICLE AIR CONDITIONER

RELATED APPLICATIONS

This is a U.S. National Phase Application under 35 USC 371 of International Application PCT/JP2017/033165 filed on Sep. 7, 2017.

This application claims the priority of Japanese application no. 2016-202850 filed Oct. 14, 2016, the entire content of which is hereby incorporated by reference.

TECHNICAL FIELD

The present invention relates to an air conditioner of a heat pump system which conditions air of a vehicle interior of a vehicle, and particularly to an air conditioner applicable to a hybrid car and an electric vehicle.

BACKGROUND ART

Due to actualization of environmental problems in recent years, hybrid cars and electric vehicles have spread. Then, as an air conditioner which is applicable to such a vehicle, there has been developed an air conditioner which includes a compressor to compress and discharge a refrigerant, a radiator provided on the side of a vehicle interior to let the refrigerant radiate heat, a heat absorber provided on the vehicle interior side to let the refrigerant absorb heat, an outdoor heat exchanger provided outside the vehicle interior to let the refrigerant radiate heat or absorb heat, and first and second expansion valves, and which changes and executes a heating operation to let the refrigerant discharged from the compressor radiate heat in the radiator, decompress the refrigerant of which heat is released by the radiator by the first expansion valve, and then let the refrigerant absorb heat in the outdoor heat exchanger, a dehumidifying and heating operation and a dehumidifying and cooling operation to let the refrigerant discharged from the compressor radiate heat and let the refrigerant of which heat is released by the radiator absorb heat in the heat absorber, and a cooling operation to let the refrigerant discharged from the compressor radiate heat in the outdoor heat exchanger, decompress the refrigerant by the second expansion valve, and then let the refrigerant absorb heat in the heat absorber.

Further, there is provided an accumulator on a refrigerant suction side of the compressor. The refrigerant is temporarily stored in the accumulator to separate gas and liquid therefrom, and the gas refrigerant is sucked into the compressor to thereby prevent or suppress a liquid return to the compressor (e.g., see Patent Document 1).

CITATION LIST

Patent Document
  Patent Document 1: Japanese Patent Application Publication No. 2012-228945

SUMMARY OF THE INVENTION

Problems to be Solved by the Invention

Here, the refrigerant gradually leaks from a refrigerant circuit of a vehicle air conditioner with the lapse of time, but in the prior art, there was no other than to protect and stop a compressor after the refrigerant was almost eliminated from a circuit. The same applies even to a case where the amount of a refrigerant sealed when servicing, etc. is small.

The present invention has been developed to solve such conventional technical problems, and an object thereof is to provide a vehicle air conditioner capable of determining a refrigerant lack accompanying a refrigerant leakage and the like over time at the earliest possible stage and protecting a compressor.

Means for Solving the Problems

A vehicle air conditioner of the invention of claim 1 includes a refrigerant circuit having a compressor to compress a refrigerant, a radiator to let the refrigerant radiate heat, a pressure reducing unit, and a heat absorber to let the refrigerant absorb heat to condition air of a vehicle interior. The vehicle air conditioner includes a control device to control the compressor. The control device holds normal time data indicating a relation between the number of revolutions NC of the compressor and a discharge refrigerant temperature Td in a normal time at which a sufficient amount of the refrigerant is filled in the refrigerant circuit. The control device calculates a discharge refrigerant temperature estimated value Tdst being an estimated value of the discharge refrigerant temperature Td in the normal time from the normal time data on the basis of the number of revolutions NC at present, and compares the discharge refrigerant temperature estimated value Tdst and the discharge refrigerant temperature Td at present to thereby determine a refrigerant lack of the refrigerant circuit.

The vehicle air conditioner of the invention of claim 2 is characterized in that in the above invention, the normal time data is data indicating a relation between the number of revolutions NC and a discharge refrigerant pressure Pd of the compressor in the normal time at which a sufficient amount of the refrigerant is filled in the refrigerant circuit, and the discharge refrigerant temperature Td.

The vehicle air conditioner of the invention of claim 3 is characterized in that in the above respective inventions, the normal time data is a multiple regression formula in which the discharge refrigerant temperature estimated value Tdst is assumed to be a target variable, and the number of revolutions NC and the discharge refrigerant pressure Pd of the compressor are assumed to be explanation variables.

A vehicle air conditioner of the invention of claim 4 includes a refrigerant circuit having a compressor to compress a refrigerant, a radiator to let the refrigerant radiate heat, a pressure reducing unit, and a heat absorber to let the refrigerant absorb heat to condition air of a vehicle interior. The vehicle air conditioner includes a control device to control the compressor. The control device holds normal time data indicating a relation between the number of revolutions NC of the compressor and a discharge refrigerant pressure Pd in a normal time at which a sufficient amount of the refrigerant is filled in the refrigerant circuit. The control device calculates a discharge refrigerant pressure estimated value Pdst being an estimated value of the discharge refrigerant pressure Pd in the normal time from the normal time data on the basis of the number of revolutions NC at present, and compares the discharge refrigerant pressure estimated value Pdst and the discharge refrigerant pressure Pd at present to thereby determine a refrigerant lack of the refrigerant circuit.

The vehicle air conditioner of the invention of claim 5 is characterized in that in the above invention, the normal time data is data indicating a relation between the number of revolutions NC and the discharge refrigerant temperature Td of the compressor in the normal time at which a sufficient amount of the refrigerant is filled in the refrigerant circuit, and the discharge refrigerant pressure Pd.

The vehicle air conditioner of the invention of claim 6 is characterized in that in the above invention, the normal time data is a multiple regression formula in which the discharge refrigerant pressure estimated value Pdst is assumed to be a target variable, and the number of revolutions NC and the discharge refrigerant temperature Td of the compressor are assumed to be explanation variables.

The vehicle air conditioner of the invention of claim 7 is characterized in that in the above respective inventions, when the control device decides that there is a doubt about a refrigerant lack of the refrigerant circuit, the control device lowers a capability of the compressor.

The vehicle air conditioner of the invention of claim 8 is characterized in that in the above invention, after the capability of the compressor is lowered, the control device determines the occurrence of the refrigerant lack of the refrigerant circuit on a condition that a difference between the discharge refrigerant temperature estimated value Tdst and the discharge refrigerant temperature Td at present, or a difference between the discharge refrigerant pressure estimated value Pdst and the discharge refrigerant pressure Pd at present becomes larger.

The vehicle air conditioner of the invention of claim 9 is characterized in that in the inventions of claims 1 through 6, when the control device decides that there is a doubt about a refrigerant lack of the refrigerant circuit, the control device narrows down a usage band of the number of revolutions NC of the compressor and in that state, compares again the discharge refrigerant temperature estimated value Tdst and the discharge refrigerant temperature Td at present or the discharge refrigerant pressure estimated value Pdst and the discharge refrigerant pressure Pd at present to determine the occurrence of the refrigerant lack of the refrigerant circuit.

The vehicle air conditioner of the invention of claim 10 is characterized in that in the above invention, in a state in which the control device narrows down the usage band of the number of revolutions NC of the compressor, the control device determines the occurrence of the refrigerant lack of the refrigerant circuit while the difference between the discharge refrigerant temperature estimated value Tdst and the discharge refrigerant temperature Td at present, or the difference between the discharge refrigerant pressure estimated value Pdst and the discharge refrigerant pressure Pd at present is smaller.

The vehicle air conditioner of the invention of claim 11 is characterized in that in the inventions of claims 8 through 10, when the control device determines the occurrence of the refrigerant lack of the refrigerant circuit, the control device executes a predetermined notifying operation.

The vehicle air conditioner of the invention of claim 12 is characterized in that in the inventions of claims 8 through 11, when the control device determines the occurrence of the refrigerant lack of the refrigerant circuit, the control device lowers the number of revolutions NC of the compressor or stops the compressor.

Advantageous Effect of the Invention

In a vehicle air conditioner to condition air of a vehicle interior, which is provided with a refrigerant circuit having a compressor to compress a refrigerant, a radiator to let the refrigerant radiate heat, a pressure reducing unit, and a heat absorber to let the refrigerant absorb heat, for example, when the amount of the refrigerant in the refrigerant circuit decreases as a result of the refrigerant gradually leaking from the refrigerant circuit, a suction refrigerant pressure Ps of the compressor is lowered. When the suction refrigerant pressure Ps of the compressor is lowered, a superheat degree SH is applied to the refrigerant to be sucked into the compressor.

When the superheat degree SH is applied to the refrigerant to be sucked into the compressor, a discharge refrigerant temperature Td of the compressor changes in the direction to rise even in the case of the same number of revolutions NC of the compressor and the same discharge refrigerant pressure Pd of the compressor, and the discharge refrigerant pressure Pd changes in the direction to decrease even in the case of the same number of revolutions NC and the same discharge refrigerant temperature Td. Such a relation is similar even in the case of the same suction refrigerant temperature Ts of the compressor, and the same discharge refrigerant pressure Pd and discharge refrigerant temperature Td, but the number of revolutions NC is higher in dependency than the suction refrigerant temperature Ts.

Also, there is a case where the discharge refrigerant temperature Td and the discharge refrigerant pressure Pd when the number of revolutions NC of the compressor is low in a state in which a sufficient amount of refrigerant is filled in the refrigerant circuit, and the discharge refrigerant temperature Td and the discharge refrigerant pressure Pd when the number of revolutions NC of the compressor is high in a state in which the refrigerant is lack, become values close to each other respectively. A determination based on the suction refrigerant temperature Ts easily causes an erroneous detection about the leakage of the refrigerant.

Thus, in the invention of claim 1, a control device holds normal time data indicating a relation between the number of revolutions NC of a compressor and a discharge refrigerant temperature Td in a normal time at which a sufficient amount of refrigerant is filled in a refrigerant circuit. The control device calculates a discharge refrigerant temperature estimated value Tdst being an estimated value of the discharge refrigerant temperature Td in the normal time from the normal time data on the basis of the number of revolutions NC at present, and compares the discharge refrigerant temperature estimated value Tdst and the discharge refrigerant temperature Td at present to thereby determine a refrigerant lack of the refrigerant circuit. Therefore, when the refrigerant gradually leaks from the refrigerant circuit and when the amount of the refrigerant sealed in the refrigerant circuit when servicing, etc. is low, it is possible to detect the occurrence of the refrigerant lack early and precisely.

In this case, as in the invention of claim 2, the normal time data is set as data indicating a relation between the number of revolutions NC and a discharge refrigerant pressure Pd of the compressor in the normal time at which a sufficient amount of the refrigerant is filled in the refrigerant circuit, and a discharge refrigerant temperature Td to thereby make it possible to appropriately calculate a discharge refrigerant temperature estimated value Tdst.

Particularly, as in the invention of claim 3, when the normal time data is represented as a multiple regression formula in which the discharge refrigerant temperature estimated value Tdst is assumed to be a target variable, and the number of revolutions NC and the discharge refrigerant pressure Pd of the compressor are assumed to be explanation variables, and the discharge refrigerant temperature estimated value Tdst is determined by the multiple regression formula from the current number of revolutions NC and the discharge refrigerant pressure Pd, it is possible to calculate the discharge refrigerant temperature estimated value Tdst more appropriately.

Further, in the invention of claim 4, a control device holds normal time data indicating a relation between the number of revolutions NC of a compressor and a discharge refrigerant pressure Pd in a normal time at which a sufficient amount of refrigerant is filled in a refrigerant circuit. The control device calculates a discharge refrigerant pressure estimated value Pdst being an estimated value of the discharge refrigerant pressure Pd in the normal time from the normal time data on the basis of the number of revolutions NC at present, and compares the discharge refrigerant pressure estimated value Pdst and the discharge refrigerant pressure Pd at present to thereby determine a refrigerant lack of the refrigerant circuit. Therefore, likewise, when the refrigerant gradually leaks from the refrigerant circuit, and when the amount of the refrigerant sealed in the refrigerant circuit when servicing, etc. is low, it is possible to detect the occurrence of a refrigerant lack early and precisely.

Even in this case, as in the invention of claim 5, the normal time data is set as data indicating a relation between the number of revolutions NC and the discharge refrigerant temperature Td of the compressor in the normal time at which a sufficient amount of the refrigerant is filled in the refrigerant circuit, and the discharge refrigerant pressure Pd to thereby make it possible to appropriately calculate the discharge refrigerant pressure estimated value Pdst.

Particularly, as in the invention of claim 6, the normal time data is represented as a multiple regression formula in which the discharge refrigerant pressure estimated value Pdst is assumed to be a target variable, and the number of revolutions NC and the discharge refrigerant temperature Td of the compressor are assumed to be explanation variables, and the discharge refrigerant pressure estimated value Pdst is determined by the multiple regression formula from the current number of revolutions NC and the discharge refrigerant temperature Td, the discharge refrigerant pressure estimated value Pdst can similarly be calculated more appropriately.

Then, as in the invention of claim 7, when the control device lowers a capability of the compressor where it is decided that there is a doubt about a refrigerant lack of the refrigerant circuit, it is possible to make even a user aware of the doubt about the refrigerant lack while protecting the compressor before the compressor enters into a region having a possibility of being faulty, and avoiding in advance the disadvantage that serious damage occurs in the compressor.

In this case, as in the invention of claim 8, when the capability of the compressor is lowered and then the control device determines the occurrence of the refrigerant lack of the refrigerant circuit on a condition that a difference between the discharge refrigerant temperature estimated value Tdst and the discharge refrigerant temperature Td at present, or a difference between the discharge refrigerant pressure estimated value Pdst and the discharge refrigerant pressure Pd at present becomes larger, the occurrence of the refrigerant lack of the refrigerant circuit can be detected precisely by two-stage decisions.

Further, as in the invention of claim 9, when it is decided that there is a doubt about a refrigerant lack of the refrigerant circuit, the control device enables even the user to make aware of the refrigerant lack while protecting the compressor before the compressor enters into a region having a possibility of being faulty even if a usage band of the number of revolutions NC of the compressor is narrowed down, and avoiding in advance the disadvantage that serious damage occurs in the compressor.

Particularly, when the discharge refrigerant temperature estimated value Tdst and the current discharge refrigerant temperature Td, or the discharge refrigerant pressure estimated value Pdst and the current discharge refrigerant pressure Pd are compared again in a state in which the usage band of the number of revolutions NC of the compressor is narrowed down, to determine the occurrence of the refrigerant lack of the refrigerant circuit, and further as in the invention of claim 10, the occurrence of the refrigerant lack of the refrigerant circuit is determined while a difference between the discharge refrigerant temperature estimated value Tdst and the discharge refrigerant temperature Td at present, or a difference between the discharge refrigerant pressure estimated value Pdst and the discharge refrigerant pressure Pd at present is smaller, the occurrence of the refrigerant lack of the refrigerant circuit can be detected precisely and quickly by two-stage decisions.

Then, as in the invention of claim 11, when the occurrence of the refrigerant lack of the refrigerant circuit is determined, the control device executes a predetermined notifying operation to thereby make it possible to warn the occurrence of the refrigerant lack to the user and urge the user to perform a speedy countermeasure thereagainst.

Further, as in the invention of claim 12, when the control device lowers the number of revolutions NC of the compressor or stops the compressor where the occurrence of the refrigerant lack of the refrigerant circuit is determined, it is possible to avoid in advance the disadvantage that the compressor is damaged accompanying the occurrence of the refrigerant lack of the refrigerant circuit, and protect the compressor.

MODE FOR CARRYING OUT THE INVENTION

Hereinafter, description will be made as to embodiments of the present invention in detail with reference to the drawings.

Embodiment 1

Figure 1:
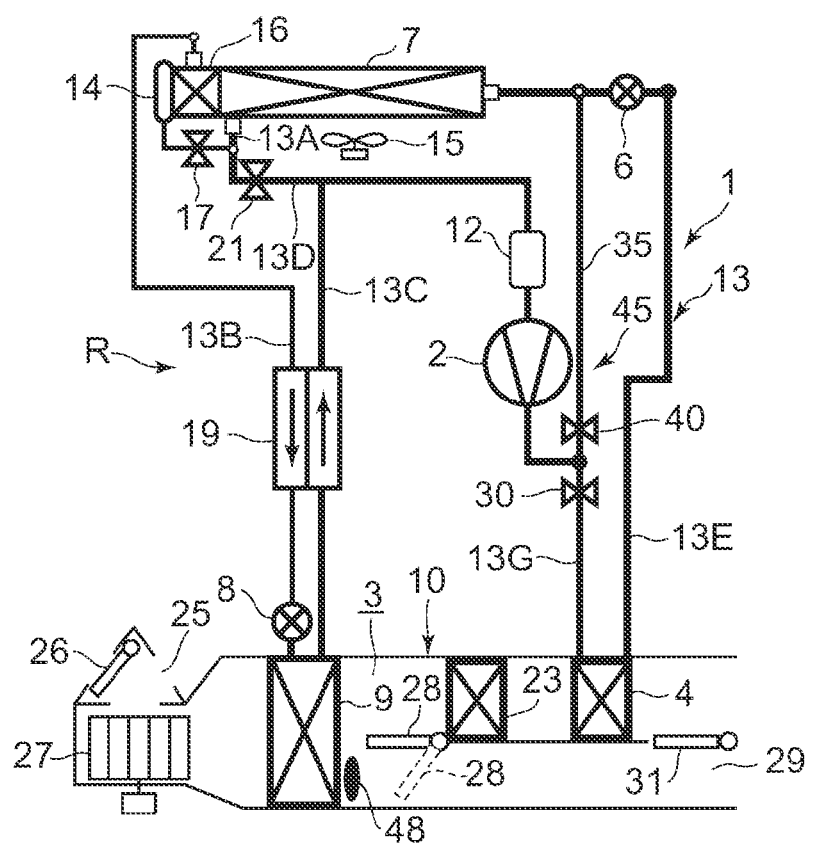
FIG. 1 is a constitutional view of a vehicle air conditioner of an embodiment to which the present invention is applied (heating mode, dehumidifying and heating mode, dehumidifying and cooling mode, and cooling mode. Embodiment 1)

FIG. 1 shows a constitutional view of a vehicle air conditioner 1 of an embodiment of the present invention. A vehicle of the embodiment to which the present invention is applied is an electric vehicle (EV) in which an engine (an internal combustion engine) is not mounted, and runs with an electric motor for running which is driven by power charged in a battery (both being not shown in the drawing), and the vehicle air conditioner 1 of the present invention is also driven by the power of the battery. That is, in the electric vehicle which is not capable of performing heating by engine waste heat, the vehicle air conditioner 1 of the embodiment performs a heating mode by a heat pump operation in which a refrigerant circuit is used. Further, the vehicle air conditioner 1 selectively executes respective operation modes of a dehumidifying and heating mode, a dehumidifying and cooling mode, a cooling mode, and a MAX cooling mode (maximum cooling mode).

Incidentally, the vehicle is not limited to the electric vehicle, and the present invention is also effective for a so-called hybrid car in which the engine is used together with the electric motor for running. Further, it is needless to say that the present invention is also applicable to a usual car which runs with the engine.

The vehicle air conditioner 1 of the embodiment performs air conditioning (heating, cooling, dehumidifying, and ventilation) of a vehicle interior of the electric vehicle. An electric type of compressor 2 to compress a refrigerant, a radiator 4 provided in an air flow passage 3 of an HVAC unit 10 in which vehicle interior air is ventilated and circulated, to let the high-temperature high-pressure refrigerant discharged from the compressor 2 flow therein via a refrigerant pipe 13G and to let the refrigerant radiate heat in the vehicle interior, an outdoor expansion valve 6 as a pressure reducing unit, constituted of an electric valve which decompresses and expands the refrigerant during the heating, an outdoor heat exchanger 7 which is provided outside the vehicle interior and which performs heat exchange between the refrigerant and outdoor air to function as the radiator during the cooling and to function as an evaporator (heat absorber) during the heating, an indoor expansion valve 8 as a pressure reducing unit, constituted of an electric valve to decompress and expand the refrigerant, a heat absorber 9 provided in the air flow passage 3 to let the refrigerant absorb heat from interior and exterior of the vehicle during the cooling and during the dehumidifying, an accumulator 12, and others are successively connected by a refrigerant pipe 13, whereby a refrigerant circuit R is constituted.

Then, the refrigerant circuit R is filled with a predetermined amount of refrigerant and oil for lubrication. Incidentally, an outdoor blower 15 is provided in the outdoor heat exchanger 7. The outdoor blower 15 forcibly passes the outdoor air through the outdoor heat exchanger 7 to thereby perform the heat exchange between the outdoor air and the refrigerant, whereby the outdoor air is made to pass through the outdoor heat exchanger 7 even during stopping of the vehicle (i.e., its velocity is 0 km/h).

Further, the outdoor heat exchanger 7 has a receiver drier portion 14 and a subcooling portion 16 successively on a refrigerant downstream side. A refrigerant pipe 13A extending out from the outdoor heat exchanger 7 is connected to the receiver drier portion 14 via a solenoid valve 17 for cooling to be opened in the dehumidifying and heating mode, the dehumidifying and cooling mode, the cooling mode, and the MAX cooling mode. A refrigerant pipe 13B on an outlet side of the subcooling portion 16 is connected to an inlet side of the heat absorber 9 via the indoor expansion valve 8. Incidentally, the receiver drier portion 14 and the subcooling portion 16 structurally constitute a part of the outdoor heat exchanger 7.

Additionally, a refrigerant pipe 13B between the subcooling portion 16 and the indoor expansion valve 8 is provided in a heat exchange relation with a refrigerant pipe 13C on an outlet side of the heat absorber 9, and both the pipes constitute an internal heat exchanger 19. Consequently, the refrigerant flowing into the indoor expansion valve 8 through the refrigerant pipe 13B is made to be cooled (subcooled) by the low-temperature refrigerant flowing out from the heat absorber 9.

In addition, the refrigerant pipe 13A extending out from the outdoor heat exchanger 7 branches to a refrigerant pipe 13D, and this branching refrigerant pipe 13D communicates and connects with the refrigerant pipe 13C on a downstream side of the internal heat exchanger 19 via a solenoid valve 21 for heating to be opened in the heating mode. The refrigerant pipe 13C is connected to the accumulator 12, and the accumulator 12 is connected to a refrigerant suction side of the compressor 2. Further, a refrigerant pipe 13E on an outlet side of the radiator 4 is connected to an inlet side of the outdoor heat exchanger 7 via the outdoor expansion valve 6.

A solenoid valve 30 for reheating, which is opened in the heating mode, the dehumidifying and cooling mode, and the cooling mode and closed in the dehumidifying and heating mode and the MAX cooling mode is interposed in the refrigerant pipe 13G between a discharge side of the compressor 2 and an inlet side of the radiator 4. In this case, the refrigerant pipe 13G branches to a bypass pipe 35 on an upstream side of the solenoid valve 30. This bypass pipe 35 communicates and connects with the refrigerant pipe 13E on a downstream side of the outdoor expansion valve 6 via a solenoid valve 40 for bypass to be opened in the dehumidifying and heating mode and the MAX cooling mode and to be closed in the heating mode, the dehumidifying and cooling mode, and the cooling mode. A bypass device 45 is constituted of these bypass pipe 35, solenoid valve 30 and solenoid valve 40.

The bypass device 45 is constituted of such a bypass pipe 35, a solenoid valve 30 and a solenoid valve 40 to thereby make it possible to smoothly perform changing of the dehumidifying and heating mode and the MAX cooling mode to allow the refrigerant discharged from the compressor 2 to directly flow in the outdoor heat exchanger 7, and the heading mode, the dehumidifying and cooling mode and the cooling mode to allow the refrigerant discharged from the compressor 2 to flow in the radiator 4, as will be described later.

Additionally, in the air flow passage 3 on an air upstream side of the heat absorber 9, respective suction ports such as an outdoor air suction port and an indoor air suction port are formed (shown as a representative by a suction port 25 in FIG. 1). There is provided in the suction port 25, a suction changing damper 26 to change the air to be introduced into the air flow passage 3 to indoor air which is air of the vehicle interior (an indoor air circulating mode) and outdoor air which is air outside the vehicle interior (an outdoor air introducing mode). Furthermore, on an air downstream side of the suction changing damper 26, an indoor blower (a blower fan) 27 for supplying the introduced indoor or outdoor air to the air flow passage 3 is provided.

Furthermore, in FIG. 1, 23 denotes an auxiliary heater as an auxiliary heating device provided in the vehicle air conditioner 1 of the embodiment. The auxiliary heater 23 of the embodiment is constituted of a PTC heater being an electric heater, and provided in the air flow passage 3 on an air upstream side of the radiator 4 to the flow of the air in the air flow passage 3. Then, when the auxiliary heater 23 is energized to generate heat, the air in the air flow passage 3, which flows into the radiator 4 via the heat absorber 9 is heated. That is, the auxiliary heater 23 becomes a so-called heater core to perform heating of the vehicle interior or complement it.

Additionally, in the air flow passage 3 on the air upstream side of the auxiliary heater 23, an air mix damper 28 is provided to adjust a ratio at which the air (the indoor air or outdoor air) in the air flow passage 3 flowing into the air flow passage 3 and passed through the heat absorber 9 is to be passed through the auxiliary heater 23 and the radiator 4. Furthermore, in the air flow passage 3 on an air downstream side of the radiator 4, there is formed each outlet (shown as a representative by an outlet 29 in FIG. 1) of FOOT (foot), VENT (vent) or DEF (def), and in the outlet 29, an outlet changing damper 31 is provided to execute changing control of blowing of the air from each outlet mentioned above.

Figure 2:
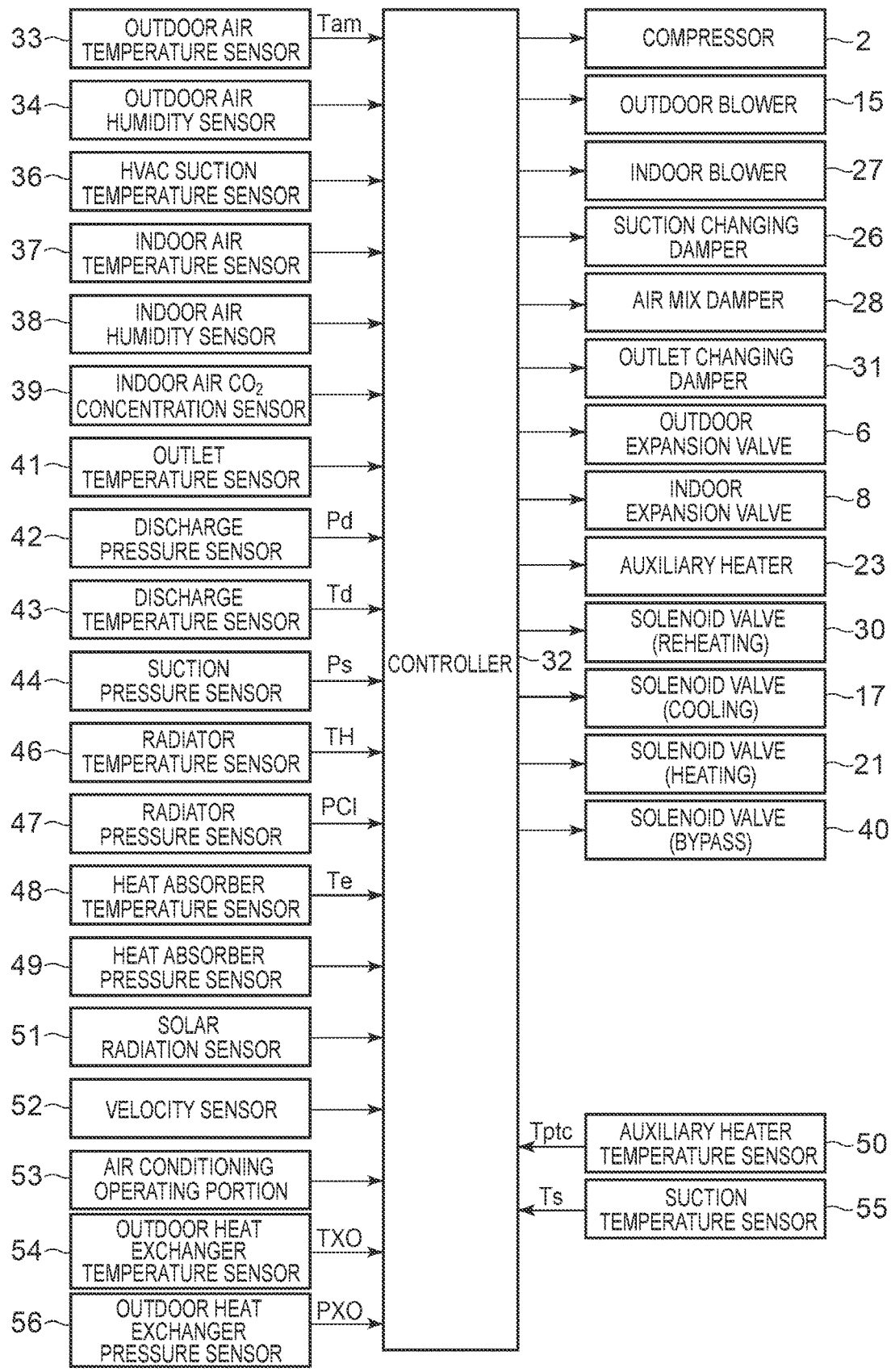
FIG. 2 is a block diagram of an electric circuit of a controller of the vehicle air conditioner of FIG. 1.

Next, in FIG. 2, 32 is a controller (ECU) as a control device, which is constituted of a microcomputer that is an example of a computer including a processor. An input of the controller 32 is connected with respective outputs of an outdoor air temperature sensor 33 which detects an outdoor air temperature (Tam) of the vehicle, an outdoor air humidity sensor 34 which detects an outdoor air humidity, an HVAC suction temperature sensor 36 which detects a temperature of the air to be sucked from the suction port 25 to the air flow passage 3, an indoor air temperature sensor 37 which detects a temperature of the air of the vehicle interior (the indoor air), an indoor air humidity sensor 38 which detects a humidity of the air of the vehicle interior, an indoor air $CO_2$ concentration sensor 39 which detects a carbon dioxide concentration of the vehicle interior, an outlet temperature sensor 41 which detects a temperature of the air to be blown out from the outlet 29 to the vehicle interior, a discharge pressure sensor 42 which detects a discharge refrigerant pressure Pd of the compressor 2, a discharge temperature sensor 43 which detects a discharge refrigerant temperature Td of the compressor 2, a suction pressure sensor 44 which detects a suction refrigerant pressure Ps of the compressor 2, a suction temperature sensor 55 which detects a suction refrigerant temperature Ts being a temperature of the refrigerant to flow out from the accumulator 12 and to be sucked into the compressor 2, a radiator temperature sensor 46 which detects a temperature of the radiator 4 (the temperature of the air passed through the radiator 4 or the temperature of the radiator 4 itself: a radiator temperature TH), a radiator pressure sensor 47 which detects a refrigerant pressure of the radiator 4 (the pressure of the refrigerant in the radiator 4 or immediately after the refrigerant flows out from the radiator 4: a radiator pressure PCI), a heat absorber temperature sensor 48 which detects a temperature of the heat absorber 9 (the temperature of the air passed through the heat absorber 9 or the temperature of the heat absorber 9 itself: a heat absorber temperature Te), a heat absorber pressure sensor 49 which detects a refrigerant pressure of the heat absorber 9 (the pressure of the refrigerant in the heat absorber 9 or immediately after the refrigerant flows out from the heat absorber 9), a solar radiation sensor 51 of, e.g., a photo sensor system to detect a solar radiation amount into the vehicle, a velocity sensor 52 to detect a moving speed (a velocity) of the vehicle, an air conditioning (aircon) operating portion 53 to set the changing of a predetermined temperature or the operation mode, an outdoor heat exchanger temperature sensor 54 which detects a temperature of the outdoor heat exchanger 7 (the temperature of the refrigerant immediately after the refrigerant flows out from the outdoor heat exchanger 7 (the temperature of the refrigerant flowing into the accumulator 12 in the heating mode to be described later: an outdoor heat exchanger temperature TXO), and an outdoor heat exchanger pressure sensor 56 which detects a refrigerant pressure of the outdoor heat exchanger 7 (the pressure of the refrigerant in the outdoor heat exchanger 7 or immediately after the refrigerant flows out from the outdoor heat exchanger 7: an outdoor heat exchanger pressure PXO). Besides, the input of the controller 32 is further connected to an output of an auxiliary heater temperature sensor 50 which detects a temperature of the auxiliary heater 23 (the temperature of the air immediately after heated by the auxiliary heater 23 or the temperature of the auxiliary heater 23 itself: an auxiliary heater temperature Tptc) as well.

On the other hand, an output of the controller 32 is connected with the compressor 2, the outdoor blower 15, the indoor blower (the blower fan) 27, the suction changing damper 26, the air mix damper 28, the outlet changing damper 31, the outdoor expansion valve 6, the indoor expansion valve 8, the auxiliary heater 23, and the respective solenoid valves of the solenoid valve 30 (for the reheating), the solenoid valve 17 (for the cooling), the solenoid valve 21 (for the heating), and the solenoid valve 40 (for the bypass). Then, the controller 32 controls these on the basis of the outputs of the respective sensors and the setting input by the air conditioning operating portion 53.

With the above constitution, an operation of the vehicle air conditioner 1 of the embodiment will next be described. In the embodiment, the controller 32 changes and executes the respective operation modes of the heating mode, the dehumidifying and heating mode, the dehumidifying and cooling mode, the cooling mode, and the MAX cooling mode. Description will initially be made as to an outline of a flow and control of the refrigerant in each operation mode.

(1) Heating Mode

When the heating mode is selected by the controller 32 (an automatic mode) or a manual operation to the air conditioning operating portion 53 (a manual mode), the controller 32 opens the solenoid valve 21 (for the heating) and closes the solenoid valve 17 (for the cooling). The controller 32 also opens the solenoid valve 30 (for the reheating) and closes the solenoid valve 40 (for the bypass). Then, the controller 32 operates the compressor 2 and the respective blowers 15 and 27, and the air mix damper 28 has a state of passing all the air in the air flow passage 3, which is blown out from the indoor blower 27 and then flows via the heat absorber 9, through the auxiliary heater 23 and the radiator 4 as indicated by a broken line in FIG. 1. In consequence, a high-temperature high-pressure gas refrigerant discharged from the compressor 2 flows from the refrigerant pipe 13G into the radiator 4 via the solenoid valve 30. The air in the air flow passage 3 passes through the radiator 4, and hence the air in the air flow passage 3 is heated by the high-temperature refrigerant in the radiator 4 (by the auxiliary heater 23 and the radiator 4 when the auxiliary heater 23 operates). On the other hand, the refrigerant in the radiator 4 has the heat taken by the air and is cooled to condense and liquefy.

The refrigerant liquefied in the radiator 4 flows out from the radiator 4 and then flows through the refrigerant pipe 13E to reach the outdoor expansion valve 6. The refrigerant flowing into the outdoor expansion valve 6 is decompressed therein, and then flows into the outdoor heat exchanger 7. The refrigerant flowing into the outdoor heat exchanger 7 evaporates, and the heat is pumped up from the outdoor air passed by running or the outdoor blower 15. In other words, the refrigerant circuit R functions as a heat pump. Then, the low-temperature refrigerant flowing out from the outdoor heat exchanger 7 flows through the refrigerant pipe 13A, the solenoid valve 21, and the refrigerant pipe 13D, and flows from the refrigerant pipe 13C into the accumulator 12 to perform gas-liquid separation thereat, and thereafter the gas refrigerant is sucked into the compressor 2, thereby repeating this circulation.

Figure 4:
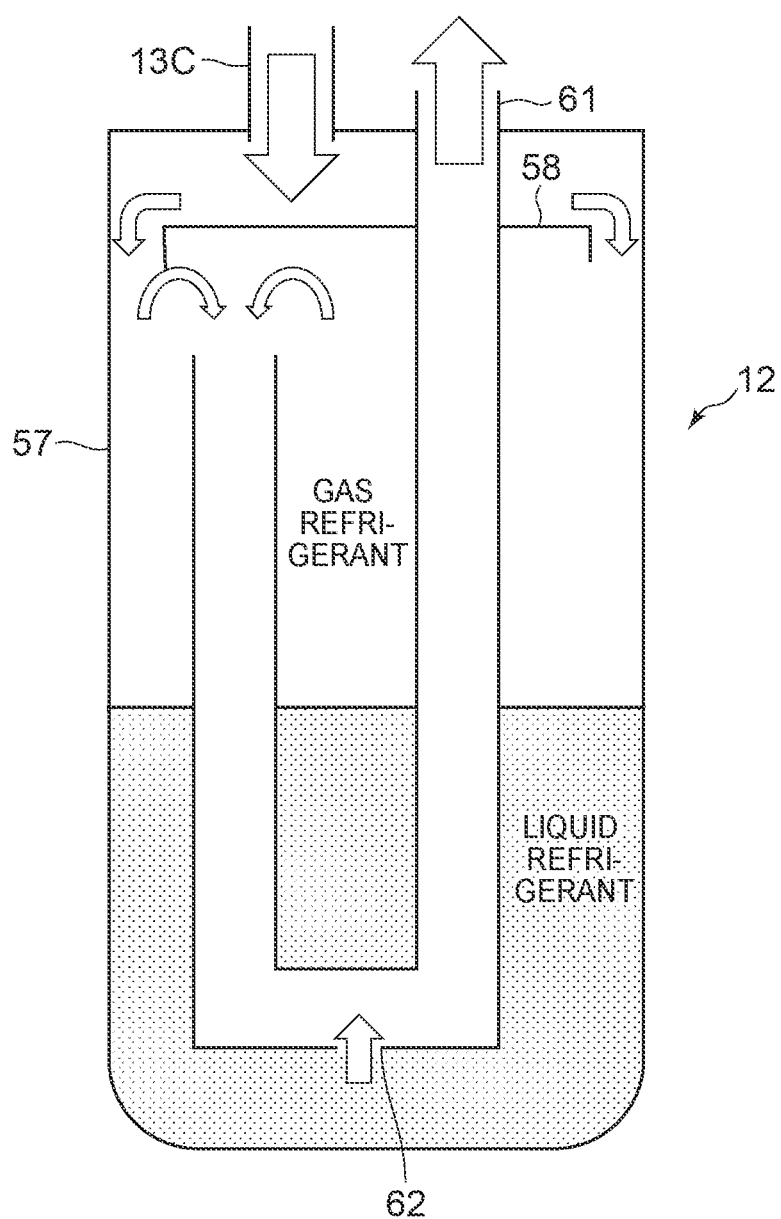
FIG. 4 is a schematic sectional view of an accumulator of the vehicle air conditioner of FIG. 1.

Here, FIG. 4 shows a sectional view of the accumulator 12. The accumulator 12 is a so-called gas-liquid separator to separate a liquid refrigerant and a gas refrigerant flowing through the refrigerant pipe 13C. The accumulator 12 is constituted of a tank 57 having vertical and horizontal predetermined dimensions and having a predetermined volume thereinside, a baffle plate 58 disposed above in the tank 57 and provided to be separated from side and upper walls of the tank 57, and an outlet pipe 61 which enters the interior of the tank 57 from its upper wall, penetrates the baffle plate 58 to temporarily fall down to the bottom in the tank 57, followed by being elevated, and causes the elevated tip to be opened with a space on a lower side of the baffle plate 58.

The lowermost portion of the outlet pipe 61 is positioned directly on the bottom wall of the tank 57 with a small allowable space. An oil return hole 62 constituted of a small hole is formed in the lowermost portion. Further, an upper end of the outlet pipe 61 extends out from the upper wall of the tank 57 and is connected to the suction side of the compressor 2. Then, the refrigerant pipe 13C enters the interior from the upper wall of the tank 57 and is opened on an upper side of the baffle plate 58.

The gas refrigerant evaporated in the outdoor heat exchanger 7 and the unevaporated liquid refrigerant flow from the refrigerant pipe 13C into the tank 57 of the accumulator 12 as indicated by an arrow in FIG. 4 through the refrigerant pipe 13A, the solenoid valve 21, and the refrigerant pipe 13D as described above. The refrigerant flowing into the tank 57, which is in a gas-liquid mixed state first collides with the baffle plate 58 to expand outside and flows down to a lower portion of the tank 57 through between an outer edge of the baffle plate 58 and the tank 57 as indicated by arrows.

Th liquid refrigerant is stored in the lower portion of the tank 57, and the gas refrigerant and the gas refrigerant in which the liquid refrigerant is evaporated in the accumulator 12 flow from an opening of the tip of the outlet pipe 61 into the outlet pipe 61 through between the tip of the outlet pipe 61 and the baffle plate 58 as indicated by arrows, and flows down. Afterwards, they rise again and flow out from the accumulator 12. Further, the oil (for lubrication of the compressor 2) circulating in the refrigerant circuit R is stored in the tank 57 together with the refrigerant. Some of this oil and the liquid refrigerant flow from the oil return hole 62 formed in the lowermost portion of the outlet pipe 61 into the outlet pipe 61 to rise and then flows out from the accumulator 12.

The refrigerant and the liquid refrigerant of the oil flowing out from the accumulator 12 absorb heat from the outside in the process of reaching the compressor 2 and evaporate, and hence only the gas refrigerant and the oil are sucked into the compressor 2. The suction temperature sensor 55 detects a temperature (a suction refrigerant temperature Ts) of this refrigerant.

The air heated in the radiator 4 (the auxiliary heater 23 and the radiator 4 when the auxiliary heater 23 operates) is blown out from the outlet 29, and hence the heating of the vehicle interior is performed. In this case, the controller 32 calculates a target radiator pressure PCO (a target value of the radiator pressure PCI) from a target radiator temperature TCO (a target value of the radiator temperature TH) calculated from an after-mentioned target outlet temperature TAO, and controls the number of revolutions NC of the compressor 2 on the basis of the target radiator pressure PCO and the refrigerant pressure (the radiator pressure PCI that is a high pressure of the refrigerant circuit R) of the radiator 4 which is detected by the radiator pressure sensor 47. Further, the controller 32 controls a valve position of the outdoor expansion valve 6 on the basis of the temperature (the radiator temperature TH) of the radiator 4 which is detected by the radiator temperature sensor 46 and the radiator pressure PCI detected by the radiator pressure sensor 47, and controls a subcool degree SC (calculated from the radiator temperature TH and the radiator pressure PCI) of the refrigerant in an outlet of the radiator 4 to a predetermined target subcool degree TGSC being its target value. The target radiator temperature TCO is basically TCO=TAO, but a predetermined limit of controlling is provided.

Further, when the heating capability by the radiator 4 runs shorter than a heating capability required for vehicle-interior air conditioning in the heating mode, the controller 32 controls energization of the auxiliary heater 23 to complement its lack by the generation of heat by the auxiliary heater 23. Thus, the comfortable heating of the vehicle interior is achieved and frosting of the outdoor heat exchanger 7 is also suppressed. At this time, since the auxiliary heater 23 is disposed on the air upstream side of the radiator 4, the air flowing through the air flow passage 3 passes through the auxiliary heater 23 before the radiator 4.

Here, when the auxiliary heater 23 is disposed on the air downstream side of the radiator 4, the temperature of the air flowing into the auxiliary heater 23 rises by the radiator 4 where the auxiliary heater 23 is constituted of the PTC heater as in the embodiment. Hence, a resistance value of the PTC heater becomes large and a current value thereof also becomes low, so that its generated heat amount is reduced, but the capability of the auxiliary heater 23 constituted of the PTC heater as in the embodiment can be exhibited sufficiently by disposing the auxiliary heater 23 on the air upstream side of the radiator 4.

(2) Dehumidifying and Heating Mode

Next, in the dehumidifying and heating mode, the controller 32 opens the solenoid valve 17 and closes the solenoid valve 21. Further, the controller 32 closes the solenoid valve 30 and opens the solenoid valve 40, and fully closes the valve position of the outdoor expansion valve 6. Then, the controller 32 operates the compressor 2 and the respective blowers 15 and 27, and the air mix damper 28 has a state of passing all the air in the air flow passage 3, which is blown out from the indoor blower 27 and then flows via the heat absorber 9, through the auxiliary heater 23 and the radiator 4 as indicated by a broken line in FIG. 1.

Consequently, the high-temperature high-pressure gas refrigerant discharged from the compressor 2 to the refrigerant pipe 13G flows into the bypass pipe 35 without flowing to the radiator 4 and reaches the refrigerant pipe 13E on the downstream side of the outdoor expansion valve 6 through the solenoid valve 40. At this time, since the outdoor expansion valve 6 is fully closed, the refrigerant flows into the outdoor heat exchanger 7. The refrigerant flowing into the outdoor heat exchanger 7 is cooled by the running therein or the outdoor air to pass through the outdoor blower 15, to condense. The refrigerant flowing out from the outdoor heat exchanger 7 flows from the refrigerant pipe 13A through the solenoid valve 17 to successively flow into the receiver drier portion 14 and the subcooling portion 16. Here, the refrigerant is subcooled.

The refrigerant flowing out from the subcooling portion 16 of the outdoor heat exchanger 7 enters the refrigerant pipe 13B and reaches the indoor expansion valve 8 through the internal heat exchanger 19. After the refrigerant is decompressed in the indoor expansion valve 8, the refrigerant flows into the heat absorber 9 to evaporate. The air blown out from the indoor blower 27 is cooled by the heat absorbing operation at this time, and the water in the air coagulates to adhere to the heat absorber 9, and hence, the air in the air flow passage 3 is cooled and dehumidified. The refrigerant evaporated in the heat absorber 9 flows through the internal heat exchanger 19 to reach the accumulator 12 via the refrigerant pipe 13C, and is gas-liquid separated as described above and then sucked into the compressor 2, thereby repeating this circulation.

At this time, since the valve position of the outdoor expansion valve 6 is fully closed, it is possible to suppress or prevent the disadvantage that the refrigerant discharged from the compressor 2 reversely flows from the outdoor expansion valve 6 into the radiator 4. Thus, the lowering of a refrigerant circulation amount is suppressed or eliminated to enable an air conditioning capacity to be ensured. Further, in the dehumidifying and heating mode, the controller 32 energizes the auxiliary heater 23 to generate heat. Consequently, the air cooled and dehumidified in the heat absorber 9 is further heated in the process of passing through the auxiliary heater 23, and the temperature rises so that the dehumidifying and heating of the vehicle interior are performed.

The controller 32 controls the number of revolutions NC of the compressor 2 on the basis of a temperature (the heat absorber temperature Te) of the heat absorber 9 detected by the heat absorber temperature sensor 48 and a target heat absorber temperature TEO being its target value, and controls energization (heat generation) of the auxiliary heater 23 on the basis of an auxiliary heater temperature Tptc detected by the auxiliary heater temperature sensor 50 and the above-described target radiator temperature TCO, thereby appropriately preventing the lowering of a temperature of the air to be blown out from the outlet 29 to the vehicle interior by the heating by the auxiliary heater 23 while appropriately performing the cooling and dehumidifying of the air by the heat absorber 9.

Consequently, it is possible to control the temperature of the air blown out to the vehicle interior to an appropriate heating temperature while dehumidifying the air. It is possible to achieve comfortable and efficient dehumidifying and heating of the vehicle interior. Further, since the air mix damper 28 has a state of passing all the air in the air flow passage 3 through the auxiliary heater 23 and the radiator 4 in the dehumidifying and heating mode as described above, the air flowing through the heat absorber 9 is efficiently heated by the auxiliary heater 23 to thereby make it possible to improve energy saving and enhance controllability of dehumidifying and heating air conditioning as well.

Incidentally, since the auxiliary heater 23 is disposed on the air upstream side of the radiator 4, the air heated in the auxiliary heater 23 passes through the radiator 4, but the refrigerant is not caused to flow into the radiator 4 in the dehumidifying and heating mode. Hence, there is also eliminated the disadvantage that the radiator 4 absorbs heat from the air heated by the auxiliary heater 23. That is, the temperature of the air blown out to the vehicle interior is suppressed from being lowered by the radiator 4, and a COP is also improved.

(3) Dehumidifying and Cooling Mode

Next, in the dehumidifying and cooling mode, the controller 32 opens the solenoid valve 17 and closes the solenoid valve 21. Further, the controller 32 opens the solenoid valve 30 and closes the solenoid valve 40. Then, the controller 32 operates the compressor 2 and the respective blowers 15 and 27, and the air mix damper 28 has a state of passing all the air in the air flow passage 3, which is blown out from the indoor blower 27 and then flows via the heat absorber 9, through the auxiliary heater 23 and the radiator 4 as indicated by the broken line in FIG. 1. In consequence, the high-temperature high-pressure gas refrigerant discharged from the compressor 2 flows from the refrigerant pipe 13G into the radiator 4 via the solenoid valve 30. Since the air in the air flow passage 3 passes through the radiator 4, the air in the air flow passage 3 is heated by the high-temperature refrigerant in the radiator 4, whereas the refrigerant in the radiator 4 has the heat taken by the air and is cooled to condense and liquefy.

The refrigerant flowing out from the radiator 4 flows through the refrigerant pipe 13E to reach the outdoor expansion valve 6, and flows through the outdoor expansion valve 6 controlled to slightly open, to flow into the outdoor heat exchanger 7. The refrigerant flowing into the outdoor heat exchanger 7 is cooled by the running therein or the outdoor air passed through the outdoor blower 15, to condense. The refrigerant flowing out from the outdoor heat exchanger 7 flows from the refrigerant pipe 13A through the solenoid valve 17 to successively flow into the receiver drier portion 14 and the subcooling portion 16. Here, the refrigerant is subcooled.

The refrigerant flowing out from the subcooling portion 16 of the outdoor heat exchanger 7 enters the refrigerant pipe 13B, and flows through the internal heat exchanger 19 to reach the indoor expansion valve 8. The refrigerant is decompressed in the indoor expansion valve 8 and then flows into the heat absorber 9 to evaporate. The water in the air blown out from the indoor blower 27 coagulates to adhere to the heat absorber 9 by the heat absorbing operation at this time, and hence, the air is cooled and dehumidified.

The refrigerant evaporated in the heat absorber 9 flows through the internal heat exchanger 19 to reach the accumulator 12 through the refrigerant pipe 13C, and is gas-liquid separated as described above to be sucked into the compressor 2, thereby repeating this circulation. Since the controller 32 does not perform energization to the auxiliary heater 23 in the dehumidifying and cooling mode, the air cooled and dehumidified by the heat absorber 9 is reheated (reheat that is lower in radiation capability than that during the heating) in the process of passing the radiator 4. Thus, the dehumidifying and cooling of the vehicle interior are performed.

The controller 32 controls the number of revolutions NC of the compressor 2 on the basis of the temperature (the heat absorber temperature Te) of the heat absorber 9 which is detected by the heat absorber temperature sensor 48, and controls the valve position of the outdoor expansion valve 6 on the basis of the above-mentioned high pressure of the refrigerant circuit R to control the refrigerant pressure (the radiator pressure PCI) of the radiator 4.

(4) Cooling Mode

Next, in the cooling mode, the controller 32 fully opens the valve position of the outdoor expansion valve 6 in the above state of the dehumidifying and cooling mode. Incidentally, the controller 32 controls the air mix damper 28 to adjust a ratio at which the air in the air flow passage 3 after being blown out from the indoor blower 27 and passed through the heat absorber 9 is to be passed through auxiliary heater 23 and the radiator 4 as indicated by a solid line in FIG. 1. Further, the controller 32 does not perform energization to the auxiliary heater 23.

Consequently, the high-temperature high-pressure gas refrigerant discharged from the compressor 2 flows from the refrigerant pipe 13G into the radiator 4 through the solenoid valve 30, and the refrigerant flowing out from the radiator 4 flows through the refrigerant pipe 13E to reach the outdoor expansion valve 6. At this time, the outdoor expansion valve 6 is fully opened, and hence, the refrigerant passes therethrough and flows into the outdoor heat exchanger 7 as it is, where the refrigerant is air-cooled by the running therein or the outdoor air to pass through the outdoor blower 15, to condense and liquefy. The refrigerant flowing out from the outdoor heat exchanger 7 flows from the refrigerant pipe 13A through the solenoid valve 17 to successively flow into the receiver drier portion 14 and the subcooling portion 16. Here, the refrigerant is subcooled.

The refrigerant flowing out from the subcooling portion 16 of the outdoor heat exchanger 7 enters the refrigerant pipe 13B and reaches the indoor expansion valve 8 through the internal heat exchanger 19. The refrigerant is decompressed in the indoor expansion valve 8 and then flows into the heat absorber 9 to evaporate. The air blown out from the indoor blower 27 is cooled by the heat absorbing operation at this time. Further, the water in the air coagulates to adhere to the heat absorber 9.

The refrigerant evaporated in the heat absorber 9 flows through the internal heat exchanger 19 to reach the accumulator 12 through the refrigerant pipe 13C, and is gas-liquid separated as described above, followed by being sucked into the compressor 2, thereby repeating this circulation. The air cooled and dehumidified in the heat absorber 9 is blown out from the outlet 29 to the vehicle interior (a part thereof passes through the radiator 4 to perform heat exchange), thereby performing the cooling of the vehicle interior. In this cooling mode, the controller 32 controls the number of revolutions NC of the compressor 2 on the basis of the temperature (the heat absorber temperature Te) of the heat absorber 9 which is detected by the heat absorber temperature sensor 48, and the target heat absorber temperature TEO being its target value.

(5) MAX Cooling Mode (Maximum Cooling Mode)

Figure 3:
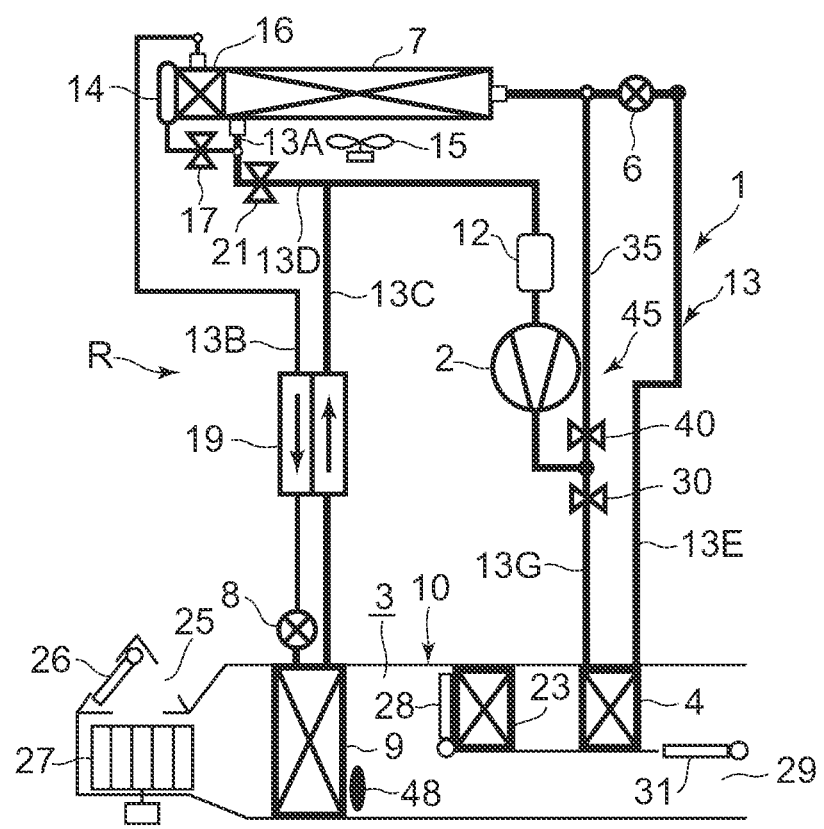
FIG. 3 is a constitutional view when the vehicle air conditioner of FIG. 1 is in a MAX cooling mode (maximum cooling mode)

Next, in the MAX cooling mode as the maximum cooling mode, the controller 32 opens the solenoid valve 17 and closes the solenoid valve 21. Further the controller 32 closes the solenoid valve 30 and opens the solenoid valve 40, and fully closes the valve position of the outdoor expansion valve 6. Then, the controller 32 operates the compressor 2 and the respective blowers 15 and 27, and the air mix damper 28 has a state in which the air in the air flow passage 3 does not pass through the auxiliary heater 23 and the radiator 4 as illustrated in FIG. 3. However, even when the air slightly passes, there are not any problems. Further, the controller 32 does not perform energization to the auxiliary heater 23.

Thus, the high-temperature high-pressure gas refrigerant discharged from the compressor 2 to the refrigerant pipe 13G flows into the bypass pipe 35 without flowing to the radiator 4, and reaches the refrigerant pipe 13E on the downstream side of the outdoor expansion valve 6 through the solenoid valve 40. At this time, since the outdoor expansion valve 6 is fully closed, the refrigerant flows into the outdoor heat exchanger 7. The refrigerant flowing into the outdoor heat exchanger 7 is air-cooled by the running therein or the outdoor air to pass through the outdoor blower 15, to condense. The refrigerant flowing out from the outdoor heat exchanger 7 flows from the refrigerant pipe 13A through the solenoid valve 17 to successively flow into the receiver drier portion 14 and the subcooling portion 16. Here, the refrigerant is subcooled.

The refrigerant flowing out from the subcooling portion 16 of the outdoor heat exchanger 7 enters the refrigerant pipe 13B and reaches the indoor expansion valve 8 through the internal heat exchanger 19. The refrigerant is decompressed in the indoor expansion valve 8 and then flows into the heat absorber 9 to evaporate. The air blown out from the indoor blower 27 is cooled by the heat absorbing operation at this time. Further, since the water in the air coagulates to adhere to the heat absorber 9, the air in the air flow passage 3 is dehumidified. A circulation is repeated in which the refrigerant evaporated in the heat absorber 9 flows through the internal heat exchanger 19 to reach the accumulator 12 via the refrigerant pipe 13C, and flows therethrough to be sucked into the compressor 2. At this time, since the outdoor expansion valve 6 is fully closed, it is possible to similarly suppress or prevent the disadvantage that the refrigerant discharged from the compressor 2 reversely flows from the outdoor expansion valve 6 to the radiator 4. Thus, the lowering of a refrigerant circulation amount is suppressed or eliminated to enable an air conditioning capacity to be ensured.

Here, since the high-temperature refrigerant flows into the radiator 4 in the above-described cooling mode, direct heat conduction from the radiator 4 to the HVAC unit 10 occurs in no small way. Since, however, the refrigerant does not flow into the radiator 4 in the MAX cooling mode, the air in the air flow passage 3 from the heat absorber 9 is not heated by the heat transferred from the radiator 4 to the HVAC unit 10. Therefore, the strong cooling of the vehicle interior is performed, and under such an environment that the outdoor air temperature Tam is high in particular, the vehicle interior is rapidly cooled to make it possible to achieve comfortable vehicle interior air conditioning. Further, even in the MAX cooling mode, the controller 32 controls the number of revolutions NC of the compressor 2 on the basis of the temperature (the heat absorber temperature Te) of the heat absorber 9 which is detected by the heat absorber temperature sensor 48, and the target heat absorber temperature TEO being its target value.

(6) Changing of Respective Operation Modes

The air passed in the air flow passage 3 is blown out from the outlet 29 to the vehicle interior in receiving the cooling from the heat absorber 9 and the heating operation (adjusted by the air mix damper 28) from the radiator 4 (and the auxiliary heater 23) in each operation mode described above. The controller 32 calculates the target outlet temperature TAO on the basis of the outdoor air temperature Tam detected by the outdoor air temperature sensor 33, the temperature of the vehicle interior detected by the indoor air temperature sensor 37, the blower voltage, the solar radiation amount or the like detected by the solar radiation sensor 51, and the target interior temperature (predetermined temperature) of the vehicle interior set in the air conditioning operating portion 53, and changes over the respective operation modes to control the temperature of the air blown out from the outlet 29 to the target outlet temperature TAO.

In this case, the controller 32 changes over the respective operation modes on the basis of parameters such as the outdoor air temperature Tam, the humidity of the vehicle interior, the target outlet temperature TAO, the radiator temperature TH, the target radiator temperature TCO, the heat absorber temperature Te, the target heat absorber temperature TEO, the presence or absence of a dehumidifying request for the vehicle interior, etc. to appropriately change the heating mode, the dehumidifying and heating mode, the dehumidifying cooling mode, the cooling mode, and the MAX cooling mode according to environmental conditions and the necessity of dehumidification, thereby achieving comfortable and efficient vehicle interior air conditioning.

(7) Determination of Refrigerant Lack by Controller 32 (part 1)

Description will next be made as to determination control for the refrigerant lack of the refrigerant circuit R by the controller 32 while referring to FIGS. 5 through 7. In particular, the vehicle air conditioner 1 used in an environment with much vibration as compared with the normal air conditioner has a problem in that the refrigerant gradually leaks from the refrigerant circuit R with time of its use. Further, there is also a case where the amount of the refrigerant sealed in the refrigerant circuit R upon the service runs short. Since the compressor 2 causes severe harm when the amount of the refrigerant in the refrigerant circuit R decreases and runs short, it is extremely important to determine the occurrence of a refrigerant lack in an early stage in terms of the protection of the device.

Here, when the amount of the refrigerant in the refrigerant circuit R decreases as a result of the refrigerant gradually leaking from the refrigerant circuit R, for example, although the refrigerant to be sucked into the compressor 2 is stored in the accumulator 12, or when the refrigerant in the refrigerant circuit R runs short due to the fact that the amount of the refrigerant sealed when servicing, etc. is low, the suction refrigerant pressure Ps of the compressor 2 is lowered, and the amount of the refrigerant stored in the accumulator 12 is also decreased. When the suction refrigerant pressure Ps of the compressor 2 is lowered, and the amount of the refrigerant in the accumulator 12 is also decreased, a superheat degree SH is applied to the refrigerant to be sucked into the compressor 2. When the superheat degree SH is applied to the refrigerant sucked into the compressor 2, the discharge refrigerant temperature Td changes in the direction to rise even in the case of the same number of revolutions NC of the compressor 2 and the same discharge refrigerant pressure Pd, and the discharge refrigerant pressure Pd changes in the direction to decrease even in the case of the same number of revolutions NC and the same discharge refrigerant temperature Td.

Such a relation is similar even in the case of the same suction refrigerant temperature Ts of the compressor 2, and the same discharge refrigerant pressure Pd and discharge refrigerant temperature Td, but the number of revolutions NC is higher in dependency than the suction refrigerant temperature Ts.

Also, there is a case where the discharge refrigerant temperature Td and the discharge refrigerant pressure Pd when the number of revolutions NC of the compressor 2 is low in a state in which a sufficient amount of refrigerant is filled in the refrigerant circuit R, and the discharge refrigerant temperature Td and the discharge refrigerant pressure Pd when the number of revolutions NC of the compressor 2 is high in a state in which the refrigerant is lack, become values close to each other respectively. A determination based on the suction refrigerant temperature Ts easily causes an erroneous detection about the leakage of the refrigerant.

This situation will next be described using FIG. 5. FIG. 5 is a P-h diagram of the refrigerant circuit R in the above-described heating mode, for example. Also, in FIG. 1, a solid line indicated by L1 is a case where the number of revolutions NC of the compressor 2 is low, e.g., 4000 rpm in a state in which the amount of the refrigerant in the refrigerant circuit R is present sufficiently. A solid line indicated by L2 is a case where the number of revolutions NC of the compressor 2 is low and 4000 rpm described above in a state in which the amount of the refrigerant in the refrigerant circuit R is lack.

Figure 5:
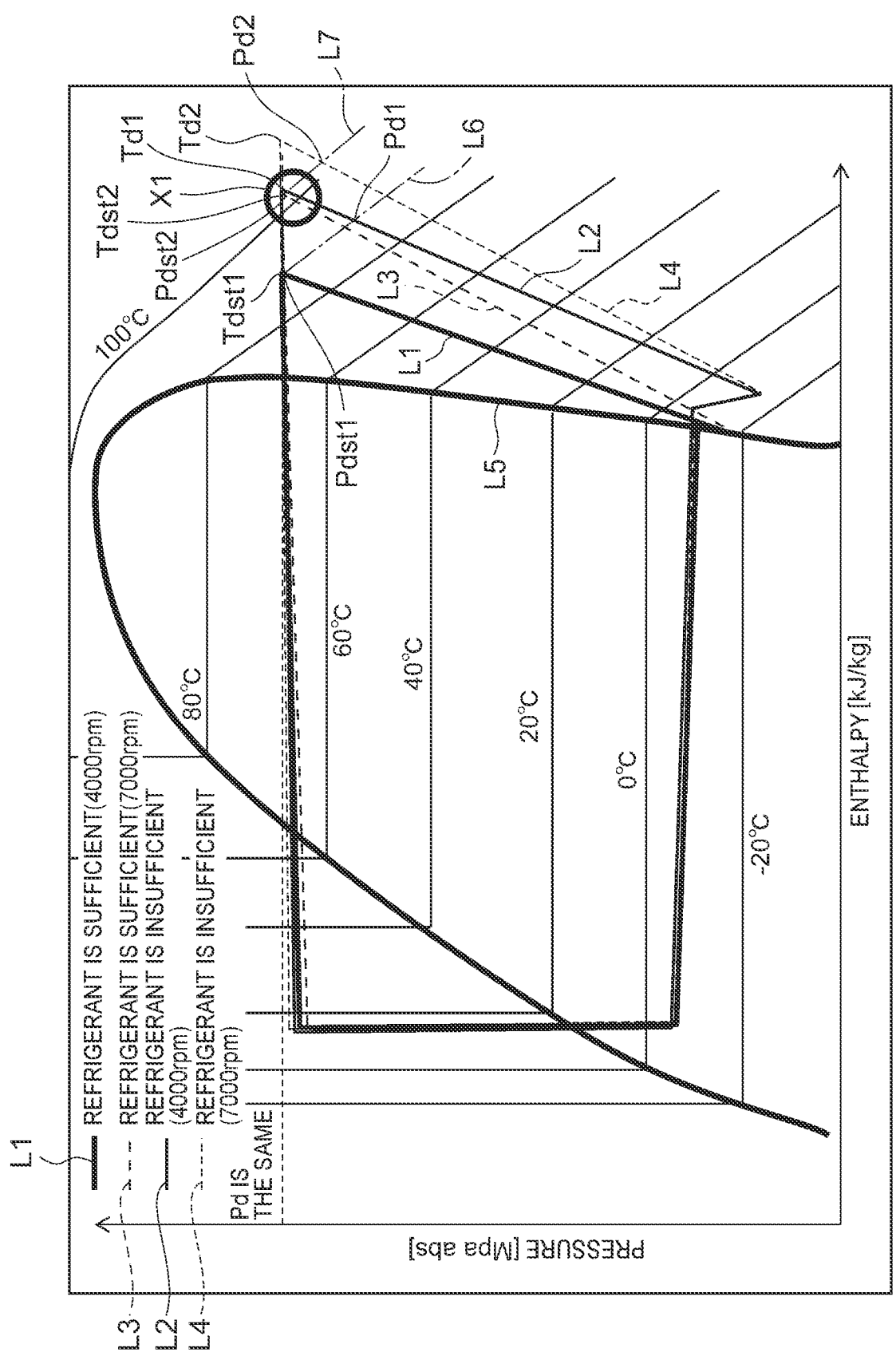
FIG. 5 is a P-h diagram of the vehicle air conditioner of FIG. 1.

Further, in FIG. 5, a broken line indicated by L3 is a case where the number of revolutions NC of the compressor 2 is high, e.g., 7000 rpm in a state in which the amount of the refrigerant in the refrigerant circuit R is present sufficiently. A broken line indicated by L4 is a case where the number of revolutions NC of the compressor 2 is high and 7000 rpm described above in a state in which the amount of the refrigerant in the refrigerant circuit R is lack. Also, L5 is a saturated vapor line.

As apparent even from this drawing, when the discharge refrigerant pressure Pd of the compressor 2 is made constant, in the state in which the amount of the refrigerant is sufficiently present in the refrigerant circuit R, the discharge refrigerant temperature Td of the compressor 2 becomes about +90° C. or so when the number of revolutions NC of the compressor 2 is low (4000 rpm) (it is indicated as Tdst1 by the solid line L1 in FIG. 5), and the discharge refrigerant temperature Td rises to about +105° C. or so when the number of revolutions NC of the compressor 2 is high (7000 rpm) (it is indicated as Tdst2 by the broken line L3 in FIG. 5).

On the other hand, for example, when the refrigerant gradually leaks from the refrigerant circuit R, and the amount of the refrigerant runs short, the amount of the liquid refrigerant stored in the accumulator 12 is also decreased, and hence the liquid refrigerant flowing out from the accumulator 12 is also reduced or almost non-discharged. Therefore, the superheat degree SH is applied to the refrigerant to be sucked into the compressor 2 due to a heat influence from the surrounding, and even when the number of revolutions NC is low (4000 rpm), the discharge refrigerant temperature Td of the compressor 2 rises to near +105° C. in the embodiment (it is indicated by Td1 of the solid line L2 in FIG. 5). When the number of revolutions NC is high (7000 rpm), the discharge refrigerant temperature Td of the compressor 2 rises to near +110° C. in the embodiment (it is indicated by Td2 of the broken line L4 in FIG. 5).

That is, when the discharge refrigerant temperature Td is near +105° C. (indicated by a circle X1 in FIG. 5), the refrigerant in the refrigerant circuit R is present sufficiently (Tdst2) when the number of revolutions NC of the compressor 2 is high, whereas when the number of revolutions NC of the compressor 2 is low, the refrigerant runs short (Td1). Thus, it becomes apt to cause an erroneous detection when the determination is made without the number of revolutions NC.

Thus, in this example, the controller 32 is caused to hold normal time data indicating a relation between the number of revolutions NC of the compressor 2 and the discharge refrigerant temperature Td thereof in the normal time at which the sufficient amount of refrigerant is filled in the refrigerant circuit R, and calculates a discharge refrigerant temperature estimated value Tdst being an estimated value of the discharge refrigerant temperature Td in the normal time on the basis of the current number of revolutions NC from the normal time data (Tdst1 and Tdst2 shown in FIG. 5). The controller 32 compares the discharge refrigerant temperature estimated value Tdst and the current discharge refrigerant temperature Td (Td1 and Td2 shown in FIG. 5) to thereby determine a lack of the refrigerant of the refrigerant circuit R.

(7-1) Normal Time Data

In the embodiment, the normal time data is represented as a multiple regression formula in which the above discharge refrigerant temperature estimated value Tdst is assumed to be a target variable, and the number of revolutions NC and the discharge refrigerant pressure Pd are assumed to be explanation variables. The multiple regression formula in the present embodiment is given by the following equation (I):

$$Tdst = A*Pd + B*NC + C \quad (I)$$

Incidentally, A and B are partial regression coefficients, and C is a constant. By substituting the current number of revolutions NC and the current discharge refrigerant pressure Pd into the equation (I), the controller 32 calculates the discharge refrigerant temperature estimated value Tdst being the estimated value of the discharge refrigerant temperature Td in the normal time.

Figure 6:
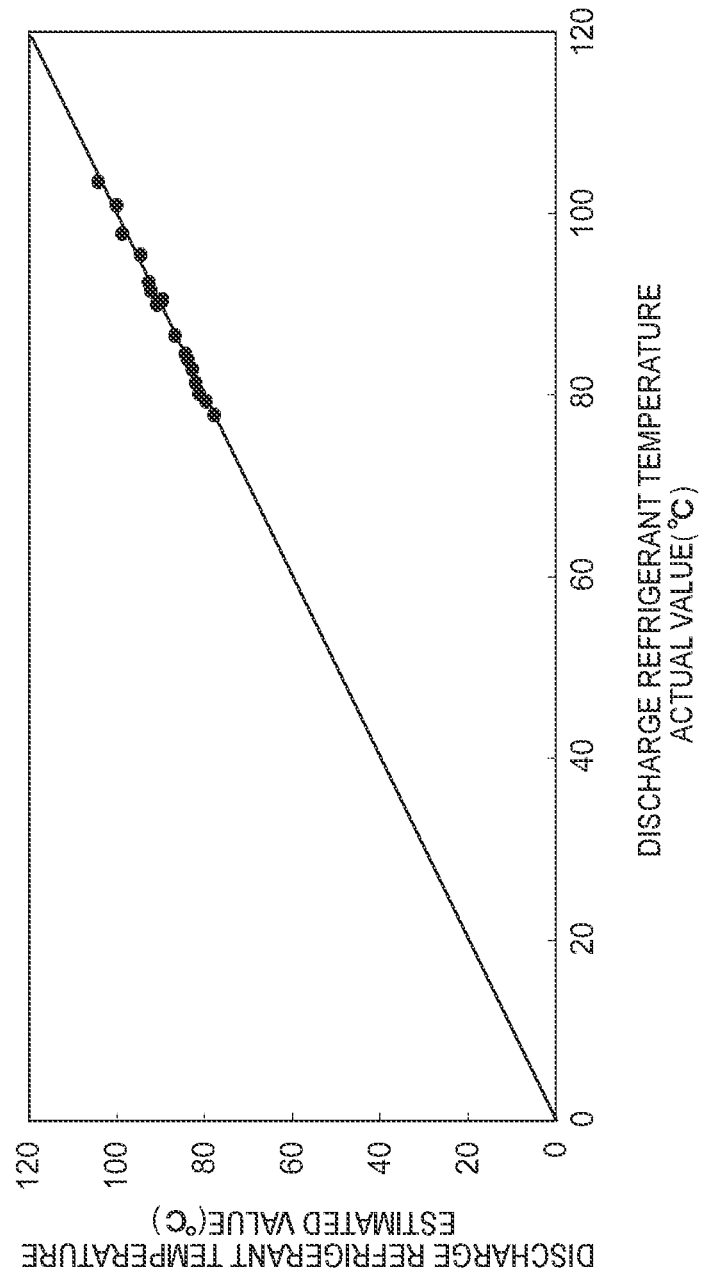
FIG. 6 is a diagram illustrating a multiple regression estimating estimated value using a rotation speed NC of a compressor.

FIG. 6 shows a relation between both the discharge refrigerant temperature estimated value Tdst (multiple regression estimating estimated value) calculated in this manner and an actual discharge refrigerant temperature Td (discharge refrigerant temperature actual value) when the discharge refrigerant temperature estimated value Tdst is taken as a vertical axis and the actual discharge refrigerant temperature Td is taken as a horizontal axis. In this drawing, the error is zero when the multiple regression estimating estimated value is placed on an oblique straight line. Although the calculated multiple regression estimating estimated value is slightly deviated from the oblique straight line, the error (multiple regression error) between both of them falls within a predetermined allowable value, and the multiple regression estimating estimated value can be determined to be sufficiently usable.

Figure 7:
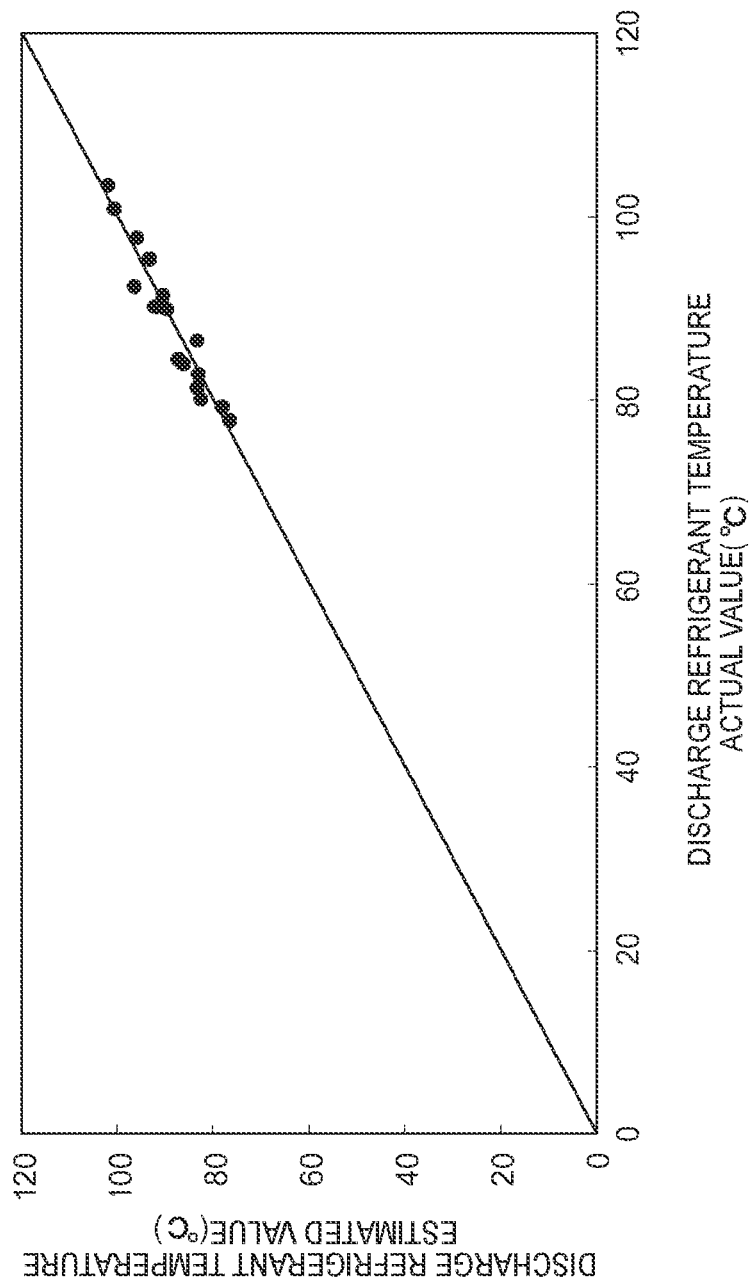
FIG. 7 is a diagram illustrating a multiple regression estimating estimated value using a suction refrigerant temperature Ts of the compressor.

On the other hand, FIG. 7 similarly shows a relation between a discharge refrigerant temperature estimated value Tdst (multiple regression estimating estimated value) and an actual discharge refrigerant temperature Td (discharge refrigerant temperature actual value) where the discharge refrigerant temperature estimated value Tdst is calculated by a similar multiple regression formula in which the discharge refrigerant temperature estimated value Tdst is assumed to be a target variable, and the suction refrigerant temperature Ts and discharge refrigerant pressure Pd of the compressor 2 are assumed to be explanation variables. As apparent even from this drawing, it is understood that variation exists in the case of the estimation by the suction refrigerant temperature Ts (FIG. 7) as compared with the case of the estimation by the number of revolutions NC (FIG. 6).

(7-2) Decision as to Doubt of Refrigerant Lack

The controller 32 compares the discharge refrigerant temperature estimated value Tdst calculated as described above, and the current discharge refrigerant temperature Td. For example, when the current discharge refrigerant temperature Td is higher than the discharge refrigerant temperature estimated value Tdst+α (e.g., 10K or the like), i.e., when (Tdst+α)<Td, the controller 32 determines that there is a doubt about the refrigerant lack of the refrigerant circuit R (a refrigerant lack doubt flag is set).

(7-3) Determination of Occurrence of Refrigerant Lack (part 1)

When it is determined that there is the doubt about the refrigerant lack of the refrigerant circuit R as described above, the controller 32 lowers an upper limit of the number of revolutions NC of the compressor 2 in the embodiment (lowers it from the normal 8000 rpm to 3000 rpm or the like, for example) to thereby lower the capability of the compressor 2. In that state, the controller 32 calculates the discharge refrigerant temperature estimated value Tdst again and next determines whether the current discharge refrigerant temperature Td is higher than the discharge refrigerant temperature estimated value Tdst+β (e.g., 15K or the like) much larger in difference than the above (α<β). Then, when (Tdst+β)<Td, the controller 32 determines the occurrence of the refrigerant lack of the refrigerant circuit R. When the occurrence of the refrigerant lack is determined, the controller 32 lowers the number of revolutions NC of the compressor 2 to a minimum number of revolutions of controlling, for example, or stops the compressor, and displays the occurrence of the refrigerant lack with the air conditioning operating portion 53 and notifies it to a user (notifying operation). Thus, the controller 32 warns the occurrence of the refrigerant lack to the user while protecting the compressor 2 to urge the user to perform a speedy countermeasure thereagainst. Incidentally, for example, when (Tdst+β)<Td is not established within a predetermined time after the capability of the compressor 2 is lowered, the controller 32 releases the doubt of the refrigerant lack (the refrigerant lack doubt flag is reset).

Thus, the normal time data indicating the relation between the number of revolutions NC of the compressor 2 and the discharge refrigerant temperature Td in the normal time at which the sufficient amount of refrigerant is filled in the refrigerant circuit R is held in the controller 32. The controller 32 calculates the discharge refrigerant temperature estimated value Tdst being the estimated value of the discharge refrigerant temperature Td in the normal time from the normal time data on the basis of the current number of revolutions NC, and compares the discharge refrigerant temperature estimated value Tdst and the current discharge refrigerant temperature Td to thereby determine the refrigerant lack of the refrigerant circuit R. Therefore, when the refrigerant gradually leaks from the refrigerant circuit R, and when the amount of the refrigerant sealed in the refrigerant circuit R when servicing, etc. is low, the controller 32 is capable of detecting the occurrence of the refrigerant lack early and precisely.

In this case, the normal time data is represented as the multiple regression formula in which the discharge refrigerant temperature estimated value Tdst is assumed to be the target variable, and the number of revolutions NC and the discharge refrigerant pressure Pd are assumed to be the explanation variables, and the discharge refrigerant temperature estimated value Tdst is determined by the multiple regression formula from the current number of revolutions NC and the discharge refrigerant pressure Pd. It is therefore possible to appropriately calculate the discharge refrigerant temperature estimated value Tdst.

Further, when it is determined that there is the doubt about the refrigerant lack of the refrigerant circuit R, the controller 32 lowers the upper limit of the number of revolutions NC of the compressor 2 to reduce the capability of the compressor 2. It is therefore possible to make even the user aware of the doubt about the refrigerant lack while protecting the compressor 2 before the compressor 2 enters into a region having a possibility of being faulty, and avoiding in advance the disadvantage that serious damage occurs in the compressor 2.

Then, the controller 32 determines the occurrence of the refrigerant lack of the refrigerant circuit R on the condition that after the capability of the compressor 2 is reduced, the difference between the discharge refrigerant temperature estimated value Tdst and the current discharge refrigerant temperature Td becomes larger (the different α being enlarged to the difference β). It is therefore possible to precisely detect the occurrence of the refrigerant lack of the refrigerant circuit R by the two-stage decisions.

(7-4) Determination of Occurrence of Refrigerant Lack (part 2)

Here, description will be made as to another example of the operation of determining the occurrence of the refrigerant lack of the refrigerant circuit R by the controller 32. In the case of this example, when it is determined that there is a doubt about the refrigerant lack of the refrigerant circuit R, the controller 32 narrows down a usage band of the number of revolutions NC of the compressor 2. For example, the number of revolutions NC of the compressor 2 is assumed to be a predetermined value (3000 rpm or the like). It is therefore possible to make even the user aware of the doubt about the refrigerant lack while protecting the compressor 2 before the compressor 2 enters into the region having the possibility of being faulty, and avoiding in advance the disadvantage that serious damage occurs in the compressor 2.

Next, in the state in which the controller 32 narrows down the usage band of the number of revolutions NC of the compressor 2 (the number of revolutions is constant in the embodiment), the controller 32 compares the discharge refrigerant temperature estimated value Tdst and the current discharge refrigerant temperature Td again to determine the occurrence of the refrigerant lack of the refrigerant circuit R. In this case, the controller 32 determines the occurrence of the refrigerant lack of the refrigerant circuit R ($\gamma<\alpha$) while the difference between the discharge refrigerant temperature estimated value Tdst and the current discharge refrigerant temperature Td is smaller (the difference being γ: (Tdst+γ)<Td such as 5K or the like). That is, even in this case, the controller 32 performs the two-stage decisions, narrows down the usage band of the number of revolutions NC of the compressor 2, and makes the difference small (γ) as well, thereby making it possible to detect the occurrence of the refrigerant lack of the refrigerant circuit R precisely and quickly with high sensitivity. Then, similarly, the controller 32 lowers the number of revolutions NC of the compressor 2 to a minimum number of revolutions of controlling, for example, or stops the compressor, and also displays the occurrence of the refrigerant lack with the air conditioning operating portion 53 and notifies it to the user (notifying operation).

(8) Decision as to Refrigerant Lack by Controller 32 (part 2)

In the above (7) decision (part 1) as to the refrigerant lack, the discharge refrigerant temperature Td of the compressor 2 and the discharge refrigerant temperature estimated value Tdst being the estimated value of the discharge refrigerant temperature Td in the normal time are compared to determine the refrigerant lack of the refrigerant circuit R, but the decision as to the refrigerant lack is not limited to it. If the same discharge refrigerant temperature Td is taken as indicated by dashed lines L6 and L7 in FIG. 5, the discharge refrigerant pressure Pd is lowered (Pdst1 is lowered to Pd1 in the case of the dashed line L6 indicating that the number of revolutions NC is 4000 rpm, and Pdst2 is lowered to Pd2 in the case of the dashed line L7 indicative of 7000 rpm). Consequently, the discharge refrigerant pressure Pd of the compressor 2 and the discharge refrigerant pressure estimated value Pdst in the normal time may be determined by comparison. That is, this is because when the refrigerant lack occurs even in the case of the same number of revolutions NC and the same discharge refrigerant temperature Td, the discharge refrigerant pressure Pd changes in the direction to decrease.

Thus, in the case of this example, the controller 32 is caused to hold normal time data indicating a relation between the number of revolutions NC of the compressor 2 and the discharge refrigerant pressure Pd thereof in the normal time at which a sufficient amount of refrigerant is filled in the refrigerant circuit R, and calculates a discharge refrigerant pressure estimated value Pdst being an estimated value of the discharge refrigerant pressure Pd in the normal time on the basis of the current number of revolutions NC from the normal time data (Pdst1 and Pdst2 shown in FIG. 5). The controller 32 compares the discharge refrigerant pressure estimated value Pdst and the current discharge refrigerant pressure Pd (Pd1 and Pd2 shown in FIG. 5) to thereby determine a lack of the refrigerant of the refrigerant circuit R.

(8-1) Normal Time Data

In the embodiment, the normal time data in this case is also represented as a multiple regression formula in which the above discharge refrigerant pressure estimated value Pdst is assumed to be a target variable, and the number of revolutions NC and the discharge refrigerant temperature Td are assumed to be explanation variables. The multiple regression formula in the present embodiment is given by the following equation (II):

$$\text{Pdst}=D*\text{Td}+E*\text{NC}+F \qquad (II)$$

Incidentally, D and E are partial regression coefficients, and F is a constant. By substituting the current number of revolutions NC and the current discharge refrigerant temperature Td into the equation (II), the controller 32 calculates the discharge refrigerant pressure estimated value Pdst being the estimated value of the discharge refrigerant pressure Pd in the normal time.

(8-2) Decision as to Doubt of Refrigerant Lack

The controller 32 compares the discharge refrigerant pressure estimated value Pdst calculated as described above, and the current discharge refrigerant pressure Pd. For example, when the current discharge refrigerant pressure Pd is lower than the discharge refrigerant pressure estimated value Pdst−α, i.e., when (Pdst−α)>Pd, the controller 32 decides that there is a doubt about the refrigerant lack of the refrigerant circuit R (a refrigerant lack doubt flag is set).

(8-3) Determination of Occurrence of Refrigerant Lack (part 1)

When it is decided that there is the doubt about the refrigerant lack of the refrigerant circuit R as described above, the controller 32 lowers an upper limit of the number of revolutions NC of the compressor 2, for example (lowers it from the normal 8000 rpm to 3000 rpm or the like, for example) to thereby lower the capability of the compressor 2. In that state, the controller 32 calculates the discharge refrigerant pressure estimated value Pdst again and next determines whether the current discharge refrigerant pressure Pd is lower than the discharge refrigerant pressure estimated value Pdst−β much larger in difference than the above (α<β). Then, when (Pdst−β)>Pd, the controller 32 determines the occurrence of the refrigerant lack of the refrigerant circuit R. When the occurrence of the refrigerant lack is determined, the controller 32 lowers the number of revolutions NC of the compressor 2 to a minimum number of revolutions of controlling, for example, or stops the compressor, and displays the occurrence of the refrigerant lack with the air conditioning operating portion 53 and notifies it to a user (notifying operation). Thus, the controller 32 warns the occurrence of the refrigerant lack to the user while protecting the compressor 2 to urge the user to perform a speedy countermeasure. Incidentally, for example, when (Pdst-β)>Pd is not established within a predetermined time after the capability of the compressor 2 is lowered, the controller 32 releases the doubt of the refrigerant lack (the refrigerant lack doubt flag is reset).

Thus, the normal time data indicating the relation between the number of revolutions NC of the compressor 2 and the discharge refrigerant pressure Pd in the normal time at which the sufficient amount of refrigerant is filled in the refrigerant circuit R is held in the controller 32. The controller 32 calculates the discharge refrigerant pressure estimated value Pdst being the estimated value of the discharge refrigerant pressure Pd in the normal time from the normal time data on the basis of the current number of revolutions NC, and compares the discharge refrigerant pressure estimated value Pdst and the current discharge refrigerant pressure Pd to thereby determine the refrigerant lack of the refrigerant circuit R. Therefore, likewise, when the refrigerant gradually leaks from the refrigerant circuit R, and when the amount of the refrigerant sealed in the refrigerant circuit R when servicing, etc. is low, the controller 32 is capable of detecting the occurrence of the refrigerant lack early and precisely.

In this case, the normal time data is represented as the multiple regression formula in which the discharge refrigerant pressure estimated value Pdst is assumed to be the target variable, and the number of revolutions NC and the discharge refrigerant temperature Td are assumed to be the explanation variables, and the discharge refrigerant pressure estimated value Pdst is determined by the multiple regression formula from the current number of revolutions NC and the discharge refrigerant temperature Td. It is therefore possible to appropriately calculate the discharge refrigerant pressure estimated value Pdst.

Further, when it is decided that there is the doubt about the refrigerant lack of the refrigerant circuit R, the controller 32 lowers the upper limit of the number of revolutions NC of the compressor 2 to reduce the capability of the compressor 2. It is therefore possible to make even the user aware of the doubt about the refrigerant lack while protecting the compressor 2 before the compressor 2 enters into a region having a possibility of being faulty, and avoiding in advance the disadvantage that serious damage occurs in the compressor 2.

Then, the controller 32 determines the occurrence of the refrigerant lack of the refrigerant circuit R on the condition that after the capability of the compressor 2 is reduced, the difference between the discharge refrigerant pressure estimated value Pdst and the current discharge refrigerant pressure Pd becomes larger (the different α being enlarged to the difference β). It is therefore possible to precisely detect the occurrence of the refrigerant lack of the refrigerant circuit R by the two-stage decisions in like manner.

(8-4) Determination of Occurrence of Refrigerant Lack (part 2)

Likewise even in this case, when it is decided that there is the doubt about the refrigerant lack of the refrigerant circuit R, the controller 32 may narrow down the usage band of the number of revolutions NC of the compressor 2. Then, in the state in which the controller 32 narrows down the usage band of the number of revolutions NC of the compressor 2 (the number of revolutions is constant in the embodiment), the controller 32 may compare the discharge refrigerant pressure estimated value Pdst and the current discharge refrigerant pressure Pd again to determine the occurrence of the refrigerant lack of the refrigerant circuit R. Also, even in this case, the controller 32 determines the occurrence of the refrigerant lack of the refrigerant circuit R (γ<α) while the difference between the discharge refrigerant pressure estimated value Pdst and the current discharge refrigerant pressure Pd is smaller (the difference γ: (Pdst-γ) >Pd). That is, even in this case, the controller 32 performs the two-stage decisions, narrows down the usage band of the number of revolutions NC of the compressor 2, and makes the difference small as well, thereby making it possible to detect the occurrence of the refrigerant lack of the refrigerant circuit R precisely and quickly with high sensitivity. Then, similarly, the controller 32 lowers the number of revolutions NC of the compressor 2 to a minimum number of revolutions of controlling, for example, or stops the compressor, and also displays the occurrence of the refrigerant lack with the air conditioning operating portion 53 and notifies it to the user (notifying operation).

Embodiment 2

Figure 8:
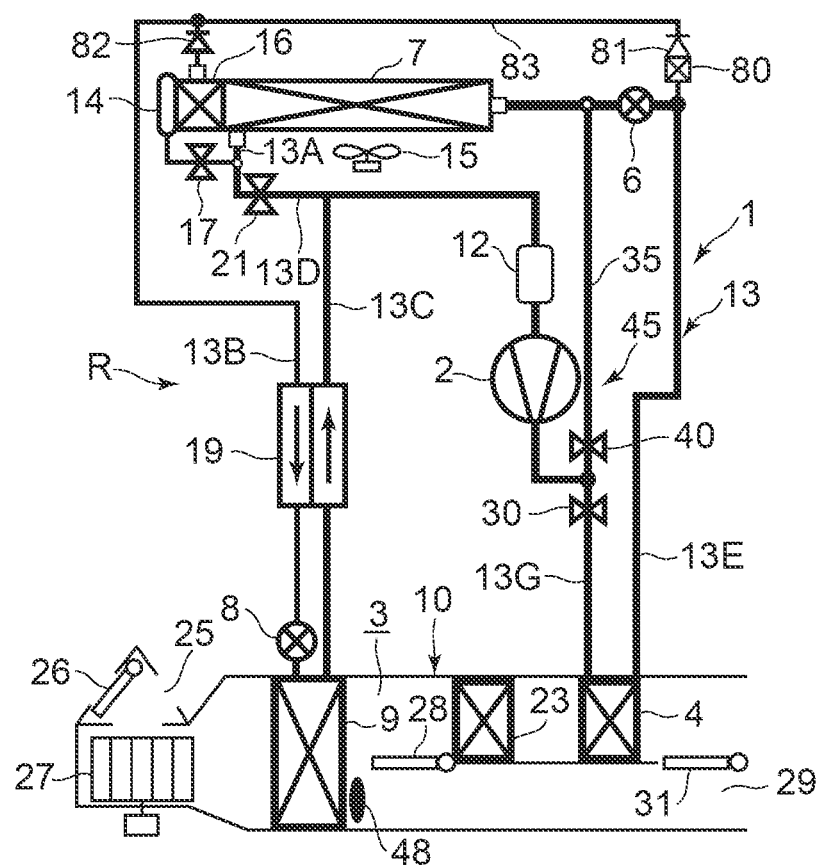
FIG. 8 is a constitutional view of a vehicle air conditioner of another embodiment of the present invention (embodiment 2).

Next, FIG. 8 shows a constitutional view of a vehicle air conditioner 1 of another embodiment to which the present invention is applied. Incidentally, in this drawing, components denoted at the same reference numerals as those in FIG. 1 or FIG. 3 have the same or similar function. In the case of the present embodiment, an outlet of a subcooling portion 16 is connected to a check valve 82. An outlet of the check valve 82 is connected to a refrigerant pipe 13B. Incidentally, the check valve 82 has a refrigerant pipe 13B (an indoor expansion valve 8) side which serves as a forward direction.

Further, a refrigerant pipe 13E on an outlet side of a radiator 4 branches before an outdoor expansion valve 6, and this branching refrigerant pipe (hereinafter called a second bypass pipe) 83 communicates and connects with a refrigerant pipe 13B on a downstream side of the check valve 82 via a solenoid valve 80 (for dehumidification) and a check valve 81. Incidentally, the check valve 82 has a refrigerant pipe 13B side which serves as a forward direction. Then, the solenoid valve 80 is also connected to an output of a controller 32. Since others are similar to those in FIG. 1 or 3 of the above-described embodiment, their description will be omitted.

With the above constitution, an operation of the vehicle air conditioner 1 of this embodiment will be described. Even in this embodiment, the controller 32 changes and executes respective operation modes of a heating mode, a dehumidifying and heating mode, a dehumidifying and cooling mode, a cooling mode, and a MAX cooling mode (maximum cooling mode). Incidentally, since operations and a flow of a refrigerant when the heating mode, the dehumidifying and cooling mode, the cooling mode, and the MAX cooling mode are selected are similar to those in the above-described embodiment (embodiment 1), their description will be omitted. However, in the present embodiment (embodiment 2), the solenoid valve 80 is assumed to be closed in these heating mode, dehumidifying and cooling mode, cooling mode and MAX cooling mode.

(9) Dehumidifying and Heating Mode of Vehicle Air Conditioner 1 in FIG. 8

On the other hand, when the dehumidifying and heating mode is selected, the controller 32 opens a solenoid valve 21 (for the heating) and closes a solenoid valve 17 (for the cooling) in this embodiment (embodiment 2). Also, the controller 32 opens a solenoid valve 30 (for the dehumidification) and closes a solenoid valve 40 (for the dehumidification). Further, the controller 32 opens the solenoid valve 80 (for the dehumidification). Then, the controller 32 operates a compressor 2 and respective blowers 15 and 27, and an air mix damper 28 has a state of passing air in an air flow passage 3 blown out from the indoor blower 27 and flowing through a heat absorber 9, through an auxiliary heater 23 and a radiator 4.

Consequently, a high-temperature high-pressure gas refrigerant discharged from the compressor 2 flows from a refrigerant pipe 13G into the radiator 4 through the solenoid valve 30. Since the air in the air flow passage 3 passes through the radiator 4, the air in the air flow passage 3 is heated by the high-temperature refrigerant in the radiator 4, whereas the refrigerant in the radiator 4 has the heat taken by the air and is cooled to condense and liquefy.

The refrigerant liquefied in the radiator 4 flows out from the radiator 4 and then reaches the outdoor expansion valve 6 through the refrigerant pipe 13E. The refrigerant flowing into the outdoor expansion valve 6 is decompressed therein, and then flows into an outdoor heat exchanger 7. The refrigerant flowing into the outdoor heat exchanger 7 evaporates, and the heat is pumped up from the outdoor air passed by running or the outdoor blower 15. In other words, a refrigerant circuit R functions as a heat pump. Then, a circulation is repeated in which the low-temperature refrigerant flowing out from the outdoor heat exchanger 7 flows via a refrigerant pipe 13A, the solenoid valve 21, and a refrigerant pipe 13D from a refrigerant pipe 13C into an accumulator 12, where it is subjected to gas-liquid separation, and thereafter the gas refrigerant is sucked into the compressor 2.

Further, a part of the condensed refrigerant flowing to the refrigerant pipe 13E through the radiator 4 is distributed and flows through the solenoid valve 80 and the check valve 81 to reach from the second bypass pipe 83 and the refrigerant pipe 13B to the indoor expansion valve 8 through an internal heat exchanger 19. The refrigerant is decompressed by the indoor expansion valve 8 and then flows into the heat absorber 9 to evaporate. The water in the air blown out from the indoor blower 27 coagulates to adhere to the heat absorber 9 by the heat absorbing operation at this time, and hence, the air is cooled and dehumidified.

A circulation is repeated in which the refrigerant evaporated in the heat absorber 9 joins the refrigerant from the refrigerant pipe 13D at the refrigerant pipe 13C through the internal heat exchanger 19, and is then sucked into the compressor 2 through the accumulator 12. The air dehumidified in the heat absorber 9 is reheated in the process of passing through the radiator 4, and hence the dehumidifying and heating of the vehicle interior are performed.

The controller 32 controls the number of revolutions of the compressor 2 on the basis of a high pressure of the refrigerant circuit R, which is detected by a discharge pressure sensor 42 or a radiator pressure sensor 47, and controls a valve position of the outdoor expansion valve 6 on the basis of a temperature of the heat absorber 9 detected by a heat absorber temperature sensor 48.

Even in the vehicle air conditioner 1 like this embodiment, the controller 32 executes the decisions as to the doubt of the refrigerant lack and the operation of determining the occurrence of the refrigerant lack in the aforementioned (7) and (8), thereby making it possible to detect the occurrence of the refrigerant lack early and precisely when the refrigerant gradually leaks from the refrigerant circuit R and when the amount of the refrigerant sealed in the refrigerant circuit R when servicing, etc. is low.

Incidentally, in the embodiment, although both the discharge refrigerant temperature estimated value $Tdst$ and the discharge refrigerant temperature $Td$, and the discharge refrigerant pressure estimated value $Pdt$ and the discharge refrigerant pressure $Pd$ are respectively compared according to their differences, they are not limited thereto. When they are respectively compared according to the ratio between the two, e.g., when $Tdst/Td$ becomes small or $Pdst/Pd$ becomes large, the refrigerant lack of the refrigerant circuit R may be determined to have occurred.

Also, in the embodiment, the normal time data is represented as the multiple regression formula in which the discharge refrigerant temperature estimated value $Tdst$ is assumed to be the object variable, and the number of revolutions NC and the discharge refrigerant pressure $Pd$ are assumed to be the explanation variables, or the multiple regression formula in which the discharge refrigerant pressure estimated value $Pdst$ is assumed to be the object variable, and the number of revolutions NC and the discharge refrigerant temperature $Td$ are assumed to be the explanation variables, but the normal time data is not limited thereto. Even in the case of data of a numerical expression or a map indicating a relation between both the number of revolutions NC and the discharge refrigerant pressure $Pd$ in the normal time at which the sufficient amount of refrigerant is filled in the refrigerant circuit, and the discharge refrigerant temperature $Td$, or data of a numerical expression or a map indicating a relation between both the number of revolutions NC and the discharge refrigerant temperature $Td$ in the normal time at which the sufficient amount of refrigerant is filled in the refrigerant circuit, and the discharge refrigerant pressure $Pd$, the discharge refrigerant temperature estimated value $Tdst$ and the discharge refrigerant pressure estimated value $Pdst$ can be appropriately calculated. However, by using the multiple regression formula as in the embodiment, the discharge refrigerant temperature estimated value $Tdst$ and the discharge refrigerant pressure estimated value $Pdst$ can be calculated more appropriately.

Further, in the embodiment, although the present invention has been described by the example of changing the respective operation modes of the heating mode, the dehumidifying and heating mode, the dehumidifying and cooling mode, the cooling mode, and the MAX cooling mode, the present invention is not limited thereto. The present invention is effective even in a vehicle air conditioner which executes only any operation mode, or their combinations.

Additionally, the control of changing the respective operation modes, which is shown in the embodiment is not limited thereto. Any of the parameters such as the outdoor air temperature Tam, the humidity of the vehicle interior, the target outlet temperature TAO, the radiator temperature TH, the target radiator temperature TCO, the heat absorber temperature Te, the target heat absorber temperature TEO, the presence or absence of the dehumidifying request for the vehicle interior, etc., or their combinations or all of them may be adopted according to the capability of the vehicle air conditioner and its use environment to set suitable conditions.

Furthermore, the auxiliary heating device is not limited to the auxiliary heater 23 shown in the embodiment, but a heating medium circulating circuit of circulating a heating medium heated by a heater to heat air in an air flow passage, a heater core of circulating radiator water heated by an engine, etc. may be utilized. In addition, the constitution of the refrigerant circuit R described in each embodiment is not limited thereto, but may be changed within the scope not departing from the spirit of the present invention.

DESCRIPTION OF REFERENCE NUMERALS

1 vehicle air conditioner
2 compressor 3 air flow passage
4 radiator
6 outdoor expansion valve (pressure reducing unit)
7 outdoor heat exchanger (radiator, heat absorber)
8 indoor expansion valve (pressure reducing unit)
9 heat absorber
17, 21, 30, 40 solenoid valve
23 auxiliary heater (auxiliary heating device)
27 indoor blower (blower fan)
28 air mix damper
32 controller (control device)
35 bypass pipe
44 suction pressure sensor
54 outdoor heat exchanger temperature sensor
55 suction temperature sensor
R refrigerant circuit.

The invention claimed is:

1. A vehicle air conditioner to condition air of a vehicle interior, including a refrigerant circuit having a compressor to compress a refrigerant, a radiator to let the refrigerant radiate heat, a pressure reducing unit, and a heat absorber to let the refrigerant absorb heat, comprising:
a control device to control the compressor,
wherein the control device holds normal time data indicating a relation between a number of revolutions NC of the compressor and a discharge refrigerant temperature Td in a normal time at which an amount of the refrigerant is filled in the refrigerant circuit,
wherein the control device calculates a discharge refrigerant temperature estimated value Tdst, where Tdst is an estimated value of the discharge refrigerant temperature Td in the normal time from the normal time data on the basis of the number of revolutions NC at present, and
wherein the control device compares the discharge refrigerant temperature estimated value Tdst and the discharge refrigerant temperature Td at present to thereby determine a lack of refrigerant in the refrigerant circuit.

2. The vehicle air conditioner according to claim 1, wherein the normal time data is data indicating a relation between the number of revolutions NC, a discharge refrigerant pressure Pd of the compressor, and the discharge refrigerant temperature Td in the normal time.

3. The vehicle air conditioner according to claim 1, wherein the normal time data is a multiple regression formula in which the discharge refrigerant temperature estimated value Tdst is assumed to be a target variable, and the number of revolutions NC and the discharge refrigerant pressure Pd of the compressor are assumed to be explanation variables.

4. A vehicle air conditioner to condition air of a vehicle interior, including a refrigerant circuit having a compressor to compress a refrigerant, a radiator to let the refrigerant radiate heat, a pressure reducing unit, and a heat absorber to let the refrigerant absorb heat, comprising:
a control device to control the compressor,
wherein the control device holds normal time data indicating a relation between a number of revolutions NC of the compressor and a discharge refrigerant pressure Pd in a normal time at which an of the refrigerant is filled in the refrigerant circuit,
wherein the control device calculates a discharge refrigerant pressure estimated value Pdst, where Pdst is an estimated value of the discharge refrigerant pressure Pd in the normal time from the normal time data on the basis of the number of revolutions NC at present, and
wherein the control device compares the discharge refrigerant pressure estimated value Pdst and the discharge refrigerant pressure Pd at present to thereby determine a lack of refrigerant in the refrigerant circuit.

5. The vehicle air conditioner according to claim 4, wherein the normal time data is data indicating a relation between the number of revolutions NC, the discharge refrigerant temperature Td of the compressor, and the discharge refrigerant pressure Pd in the normal time.

6. The vehicle air conditioner according to claim 4, wherein the normal time data is a multiple regression formula in which the discharge refrigerant pressure estimated value Pdst is assumed to be a target variable, and the number of revolutions NC and the discharge refrigerant temperature Td of the compressor are assumed to be explanation variables.

7. The vehicle air conditioner according to claim 1, wherein when the control device decides that there is a doubt about the lack of refrigerant in the refrigerant circuit, the control device lowers a capability of the compressor.

8. The vehicle air conditioner according to claim 7, wherein after the capability of the compressor is lowered, the control device determines the occurrence of the lack of refrigerant in the refrigerant circuit on a condition that a difference between the discharge refrigerant temperature estimated value Tdst and the discharge refrigerant temperature Td at present, or a condition that a difference between the discharge refrigerant pressure estimated value Pdst and the discharge refrigerant pressure Pd at present becomes larger.

9. The vehicle air conditioner according to claim 1, wherein when the control device decides that there is a doubt about a lack of refrigerant in the refrigerant circuit, the control device narrows down a usage band of the number of revolutions NC of the compressor and in that state, compares again the discharge refrigerant temperature estimated value Tdst and the discharge refrigerant temperature Td at present, or compares again the discharge refrigerant pressure estimated value Pdst and the discharge refrigerant pressure Pd at present to determine the occurrence of the lack of refrigerant in the refrigerant circuit.

10. The vehicle air conditioner according to claim 9, wherein in a state in which the control device narrows down the usage band of the number of revolutions NC of the compressor, the control device determines the occurrence of the lack of refrigerant in the refrigerant circuit while the difference between the discharge refrigerant temperature estimated value Tdst and the discharge refrigerant temperature Td at present, or the difference between the discharge refrigerant pressure estimated value Pdst and the discharge refrigerant pressure Pd at present is smaller.

11. The vehicle air conditioner according to claim 8, wherein when the control device determines the occurrence of the lack of refrigerant in the refrigerant circuit, the control device executes a predetermined notifying operation.

12. The vehicle air conditioner according to claim 8, wherein when the control device determines the occurrence of the lack of refrigerant in the refrigerant circuit, the control device lowers the number of revolutions NC of the compressor or stops the compressor.

* * * * *